(12) United States Patent
Simpson

(10) Patent No.: US 11,864,501 B2
(45) Date of Patent: Jan. 9, 2024

(54) TREE BOX

(71) Applicant: James M. Simpson, Scandia, MN (US)

(72) Inventor: James M. Simpson, Scandia, MN (US)

(*) Notice: Subject to any disclaimer, the term of this patent is extended or adjusted under 35 U.S.C. 154(b) by 432 days.

(21) Appl. No.: 16/688,890

(22) Filed: Nov. 19, 2019

(65) Prior Publication Data

US 2020/0154651 A1 May 21, 2020

Related U.S. Application Data

(60) Provisional application No. 62/769,451, filed on Nov. 19, 2018.

(51) Int. Cl.
| | |
|---|---|
| *A01G 9/02* | (2018.01) |
| *A01G 23/04* | (2006.01) |
| *A01G 9/00* | (2018.01) |

(52) U.S. Cl.
CPC ............ *A01G 23/043* (2013.01); *A01G 9/02* (2013.01); *A01G 2009/003* (2013.01)

(58) Field of Classification Search
CPC ...... A01G 23/043; A01G 23/04; A01G 23/02; A01G 9/02; A01G 9/033; A01G 9/088; A01G 2009/003; B65D 88/1687; B65D 2519/00796
See application file for complete search history.

(56) References Cited

U.S. PATENT DOCUMENTS

| | | | | |
|---|---|---|---|---|
| 2,261,384 A | * | 11/1941 | Jones ................... | A01G 23/046 47/76 |
| 3,006,496 A | * | 10/1961 | Weiman ................... | B65D 9/12 47/73 |
| 4,850,136 A | * | 7/1989 | Vollers ..................... | A01G 9/02 47/66.2 |
| 5,158,418 A | * | 10/1992 | Korenek .............. | A01G 23/046 414/469 |
| 5,236,099 A | * | 8/1993 | Fties ...................... | B65D 19/18 220/4.31 |
| 5,441,154 A | * | 8/1995 | Youell, III ......... | B65D 19/0026 493/137 |
| 5,953,858 A | | 9/1999 | Loosen | |
| 6,202,569 B1 | * | 3/2001 | Bailey .................. | B65D 19/385 108/53.5 |
| 9,655,307 B2 | * | 5/2017 | Burmann ................ | A01G 9/021 |
| 2003/0208957 A1 | * | 11/2003 | Meurer .................. | A01G 23/04 47/73 |

(Continued)

FOREIGN PATENT DOCUMENTS

| | | | | |
|---|---|---|---|---|
| CN | 106718220 A | * | 5/2017 | ............... A01G 9/02 |
| CN | 108513885 A | * | 9/2018 | |

(Continued)

OTHER PUBLICATIONS

Experimental test of wood boxes in which trees were planted Nov. 2013 and Spring 2014, 2 pages.

(Continued)

*Primary Examiner* — Son T Nguyen

(74) *Attorney, Agent, or Firm* — Merchant & Gould P.C.

(57) ABSTRACT

A tree box for growing and transporting a tree includes sidewalls and a removable bottom panel. The bottom panel can be removed prior to replanting the tree. In some embodiments portions of the tree box are formed of a plastic material.

2 Claims, 36 Drawing Sheets

(56) References Cited

U.S. PATENT DOCUMENTS

| | | | | |
|---|---|---|---|---|
| 2004/0177578 A1* | 9/2004 | Casimaty | ............... | A63C 19/00 52/653.1 |
| 2004/0211096 A1* | 10/2004 | Kewan | ................. | A01G 23/043 37/302 |
| 2006/0230677 A1* | 10/2006 | Bonahoom | .......... | A01G 23/043 47/76 |
| 2009/0183429 A1* | 7/2009 | Kim | ....................... | A01G 9/022 47/79 |

FOREIGN PATENT DOCUMENTS

| | | | | | |
|---|---|---|---|---|---|
| CN | 109392519 A | * | 3/2019 | ............... | A01G 9/02 |
| EP | 3486374 A1 | * | 5/2019 | .............. | E01F 13/12 |
| FR | 2599215 A1 | * | 12/1987 | | |
| FR | 3072695 A1 | * | 4/2019 | | |
| GB | 2333094 A | * | 7/1999 | ......... | B65D 19/0028 |
| KR | 20110087721 A | * | 8/2011 | | |
| KR | 20140007225 A | * | 1/2014 | | |
| KR | 101454016 B1 | * | 10/2014 | | |

OTHER PUBLICATIONS

Experimental test of box in which an oak tree was planted Nov. 21, 2017, 3 pages.
Experimental test boxes in which 25 trees were planted Spring 2019, 3 pages.
Wood tree boxes, Applicant Admitted Prior Art as of the filing date, 1 page.
Capozzoli, Sara, How to Plant Containerized Trees?, posted on Oct. 23, 2016, 4 pages.
Majestic Trees, About Air-Pots, https://www.majestictrees.co.uk/read-up/about-airpots.html, accessed on May 19, 2020, 6 pages.
Majestic Trees, How the Air-Pot works, https://www.youtube.com/watch?v=N03Wi5vB0Uo, Mar. 19, 2018, 1 page.
Air-Pot, The Air-Pot system for landscape designers air-pot.com, https://www.youtube.com/watch?v=yqdOx3BG1ZY, Dec. 17, 2013, 1 page.
Air-Pot, Steve McCurdy of Majestic trees on the Air-Pot system air-pot.com, https://www.youtube.com/watch?v=0_QrTfM-BDc, Nov. 28, 2013, 1 page.
Air-Pot, Tony Kirkham at Kew talks about the Air-Pot system, https://www.youtube.com/watch?v=gRvDWmirfgk, Jul. 4, 2014, 1 page.
Majestic Trees, Planting Services, https://www.majestictrees.co.uk/plan-arrival/planting-services.html, accessed on May 19, 2020, 4 pages.
Majestic Trees, Delivery Options, https://www.majestictrees.co.uk/our-services/delivery-options.html, accessed on May 19, 2020, 4 pages.
Majestic Trees, The Fleet & Machines, https://www.majestictrees.co.uk/our-team/the-fleet-machines.html, accessed on May 19, 2020, 4 pages.
Amaroo Enterprises, Inc., Tree Boxes Photo Gallery, https://www.amarootreeboxes.com/photo_gallery.htm, accessed on May 19, 2020, copyright 2000-2019, 2 pages.
Amaroo Enterprises, Inc., Product Specification Sheet, https://www.amarootreeboxes.com/spec2.html, accessed on May 19, 2020, 2 pages.
Amaroo Enterprises, Inc., Tree Boxes, https://www.amarootreeboxes.com/treeboxes.htm, accessed on May 19, 2020, copyright 2000-2019, 1 pages.
Majestic Trees, How the Air-Pot works, https://www.youtube.com/watch?v=N03Wi5vBOUo, Mar. 19, 2018, 5 pages.
Air-Pot, The Air-Pot system for landscape designers air-pot.com, https://www.youtube.com/watch?v=yqdOx3BG1ZY, Dec. 17, 2013, 3 pages.
Air-Pot,Steve McCurdy of Majestic trees on the Air-Pot system air-pot.com, https://www.youtube.com/watch?v=0_QrTfM-BDc, Nov. 28, 2013, 3 pages.
Air-Pot, Tony Kirkham at Kew talks about the Air-Pot system, https://www.youtube.com/watch?v=gRvDWmirfgk, Jul. 4, 2014, 3 pages.

\* cited by examiner

TREE BOX

BACKGROUND

When transporting large live trees to a new location, trees are traditionally grown in the earth and cut out of the ground with a tree spade before being shipped. Using this method, trees can only be harvested during a short window of time in the spring or fall to prevent them from going into shock and dying. When trees are harvested, a large portion of the tree's root system is outside the spade area and is thereby severed from the tree and left in the ground. Additionally, during transportation, the root ball of the tree is exposed and subject to damage.

The combination of the climate shock the tree experiences when moving environments, the drying of the tree roots while exposed to air, severance of the root system, and mechanical disruption to the root system leads to high mortality rates of trees once they are planted in a new location. Additionally, the fact that trees can only be transplanted during a few select weeks of the year leads to inefficiencies in the transplantation process.

SUMMARY

In general terms, this disclosure is directed to a tree box and methods of making and using same. In one possible configuration and by non-limiting example, the tree box is used for growing and transporting a tree to be planted in landscapes. In some embodiments the tree box includes a bottom that is removable prior to replanting. Various aspects are described in this disclosure, which include, but are not limited to, the aspects listed in the claims, as well as other aspects listed in the following description and shown in the enclosed drawings.

One aspect is a tree box for growing and transporting a tree, the tree box comprising: a plurality of side panels configured to be fastened together to define an interior space for supporting a root ball of the tree therein, the plurality of sidewalls having bottom ends; and a removable bottom panel configured to be removably fastened to the bottom ends of the side panels, whereas the bottom panel is removable prior to replanting the tree.

Another aspect is a tree box for growing and transporting a tree, the tree box comprising: a plurality of side panels configured to be fastened together to define an interior space for supporting a root ball of the tree therein, the plurality of sidewalls having bottom ends; a removable bottom panel configured to be removably fastened to the bottom ends of the side panels, whereas the bottom panel is removable prior to replanting the tree; and forklift compatible lifting tubes arranged at the bottom ends of at least two of the plurality of sidewalls.

DETAILED DESCRIPTION

Figure 1:
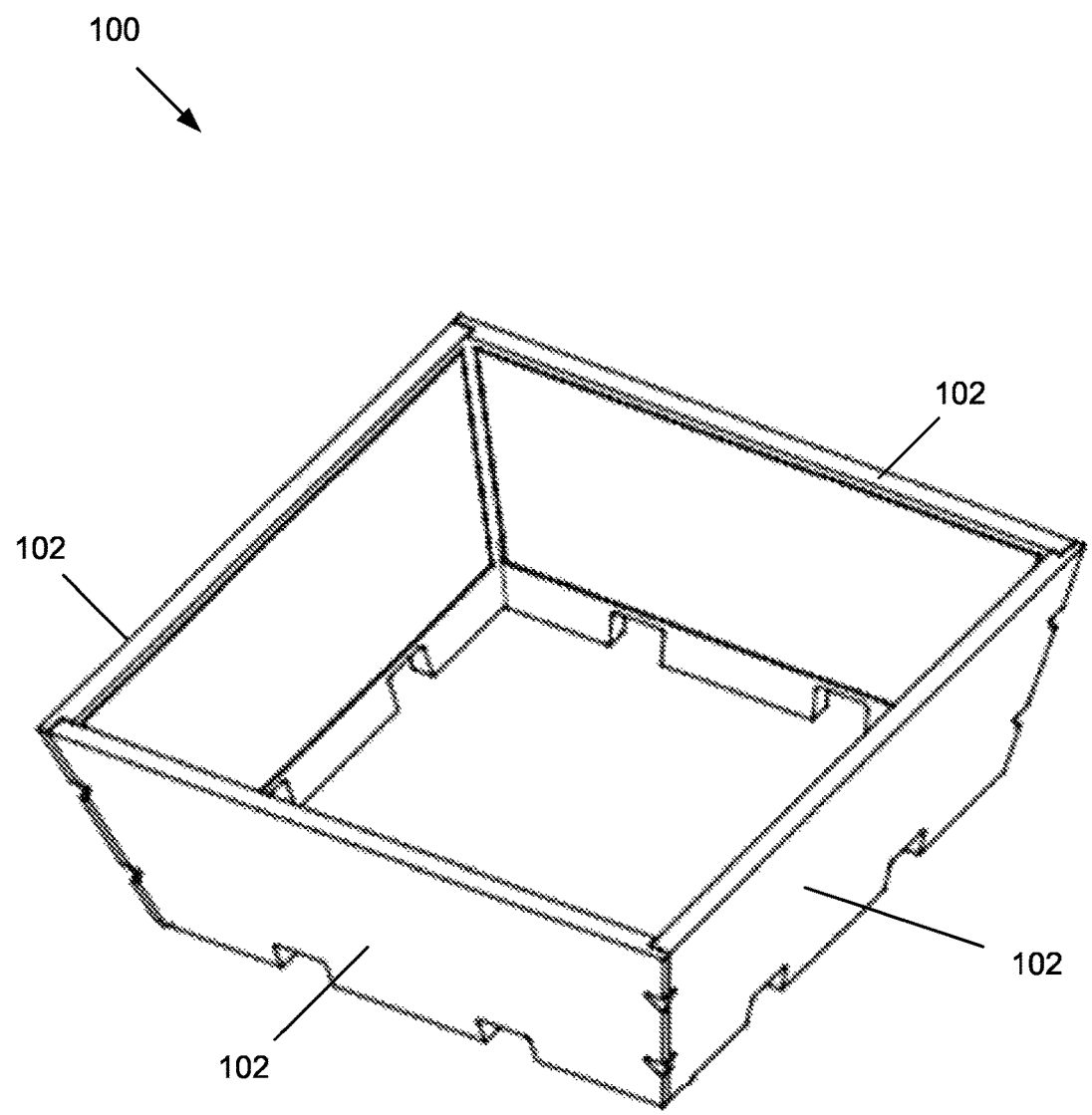
FIG. 1 is a perspective view of an example tree box.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This disclosure relates to a tree box, and more specifically to a tree box for growing and transporting a tree to be planted in a landscape. In some embodiments the tree box provides protection to the base of the tree (including its roots) to protect it from various possible environmental conditions. In some embodiments the tree box includes a removable bottom panel.

Figure 2:
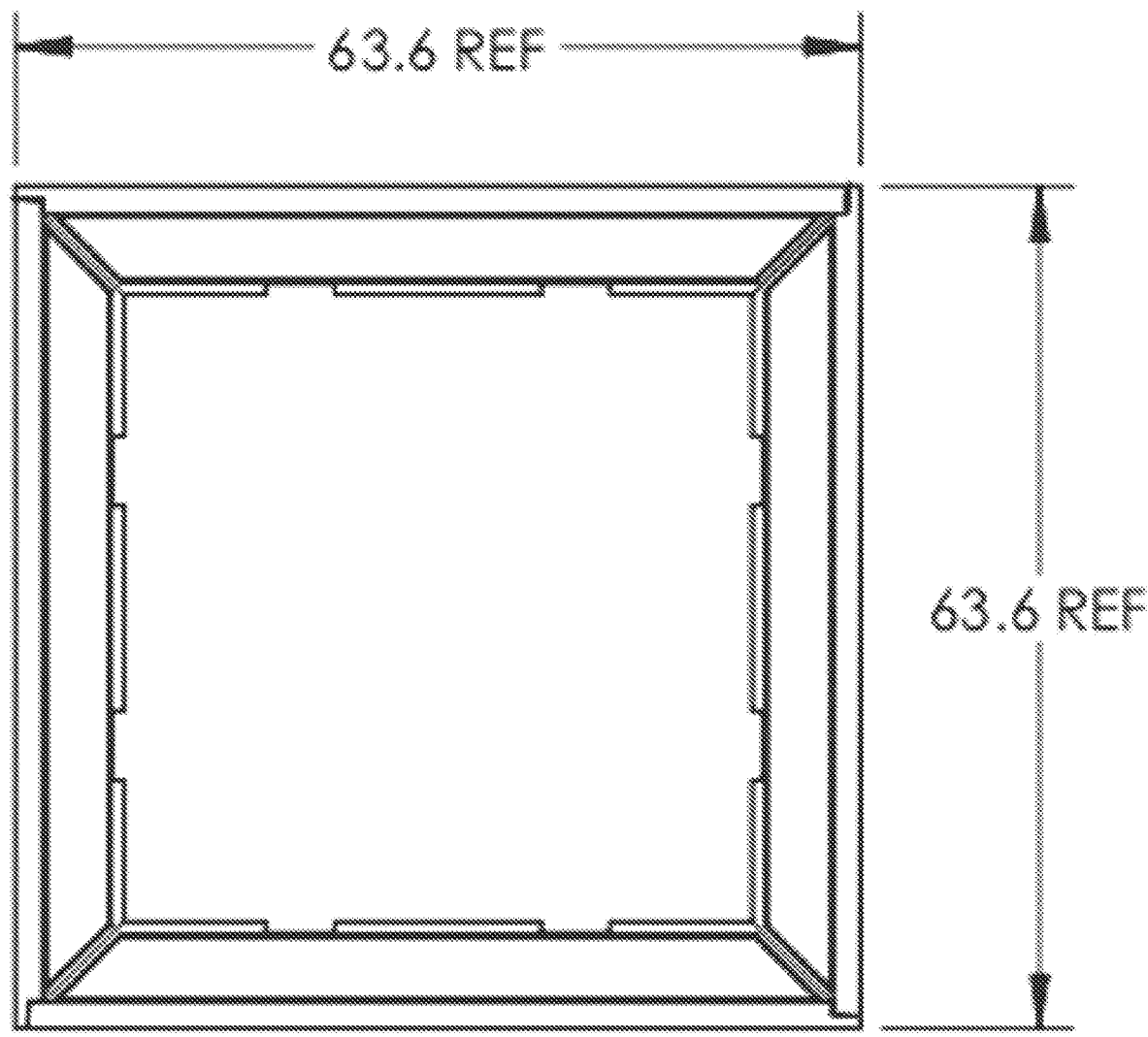
FIG. 2 is a top view of the example tree box in FIG. 1.
Figure 3:
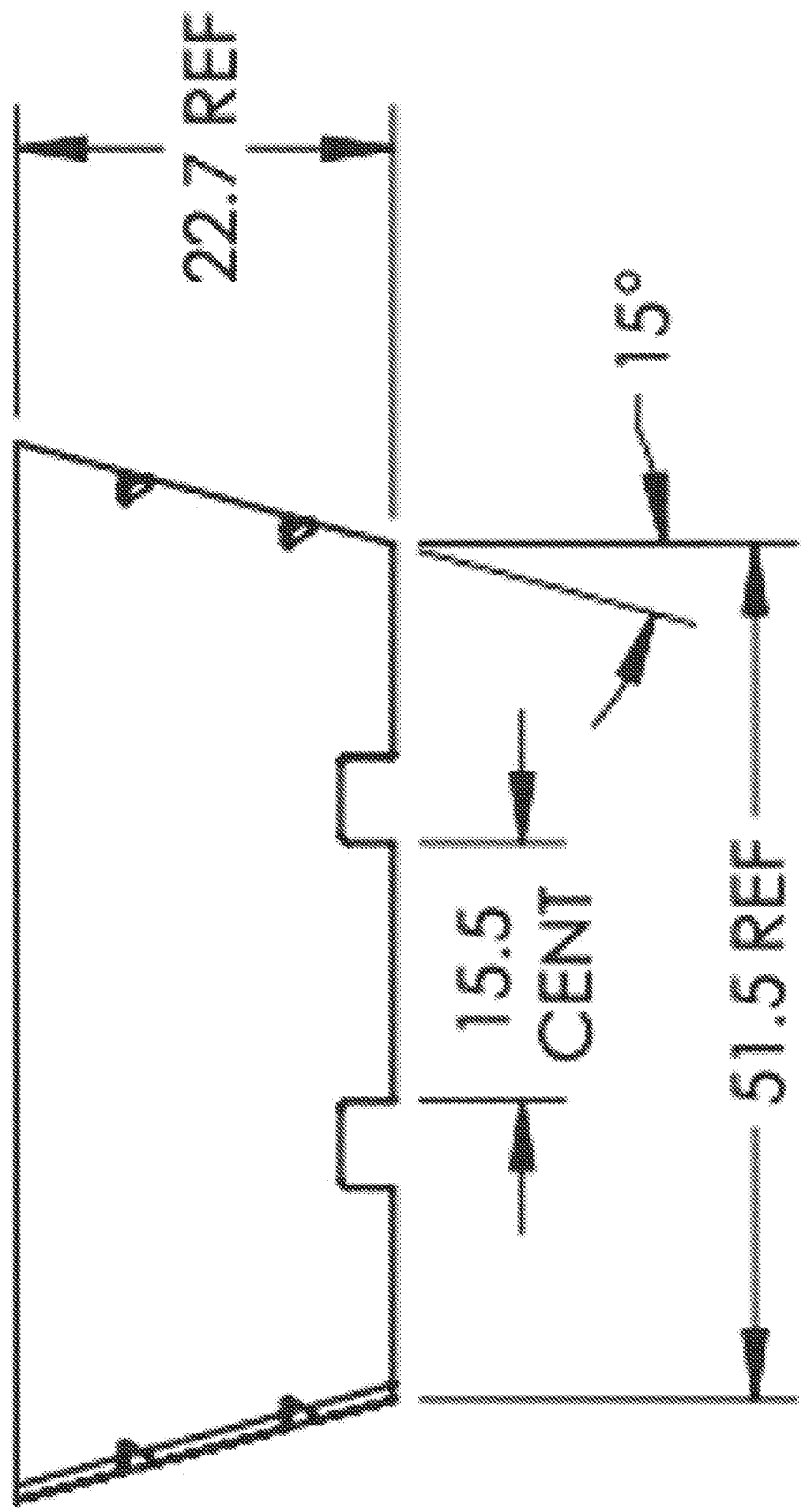
FIG. 3 is a side view of the example tree box in FIG. 1.
Figure 4:
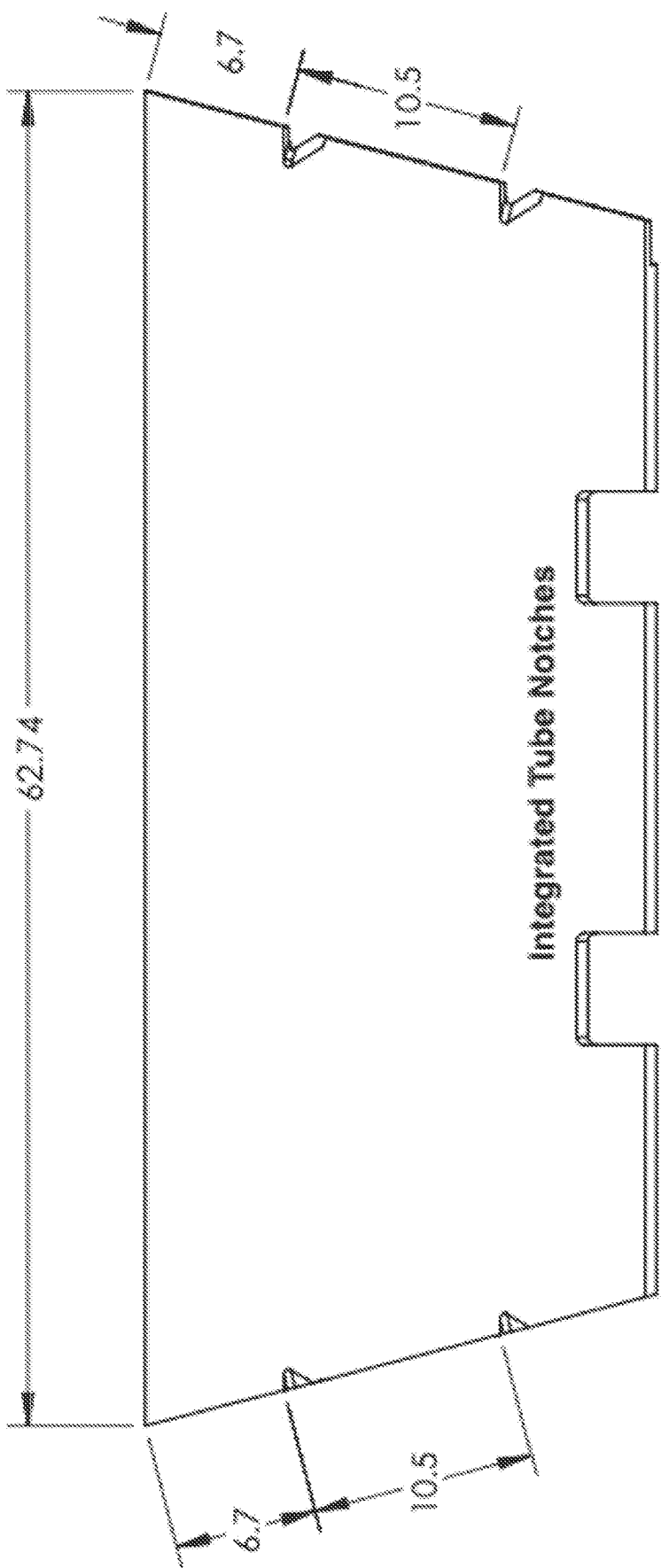
FIG. 4 is a front view of a side panel of the tree box of FIG. 1.
Figure 5:
FIG. 5 is a bottom view of a side panel of FIG. 4.
Figure 6:
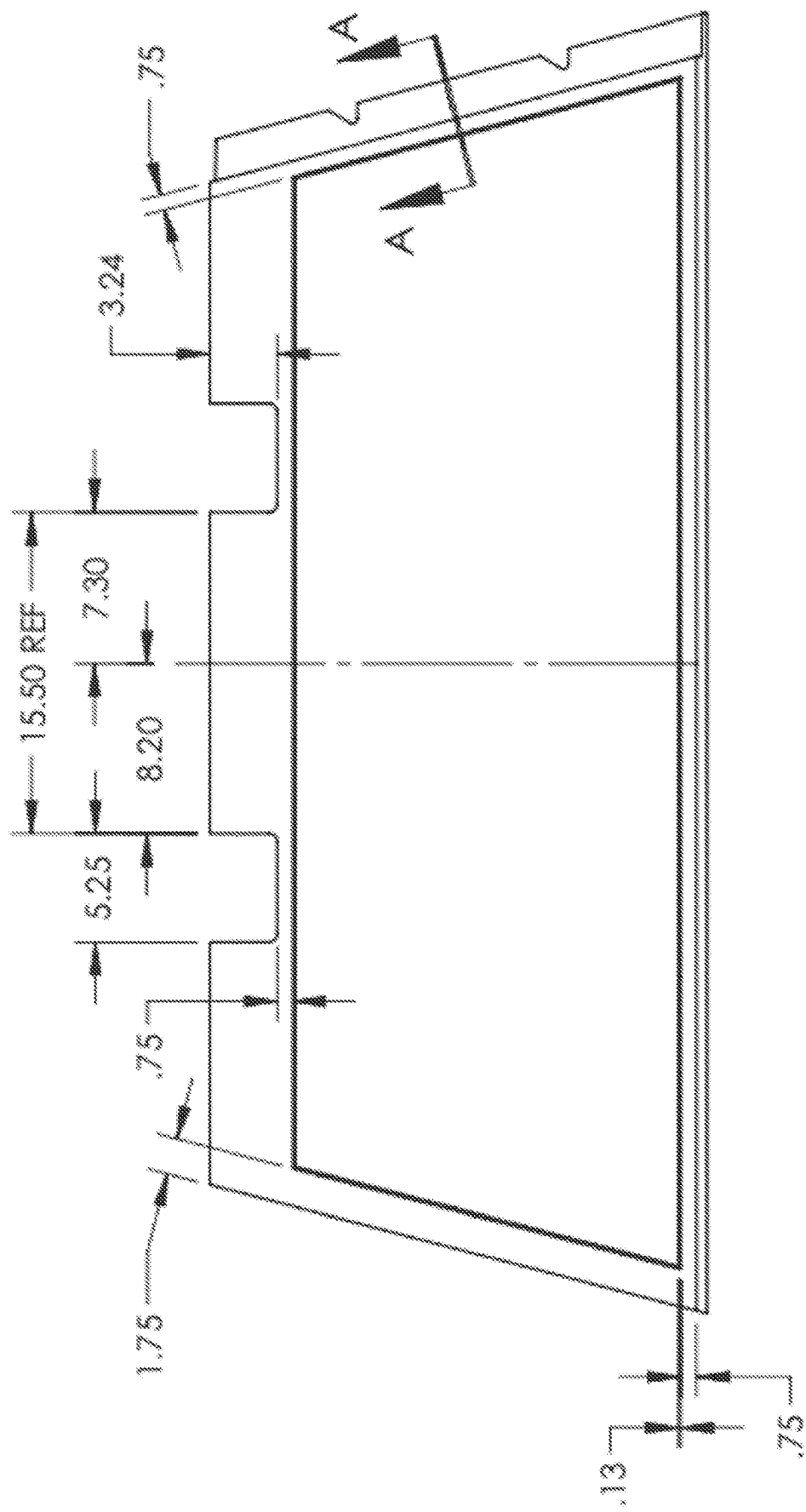
FIG. 6 is a back view of the side panel of FIG. 4.
Figure 7:
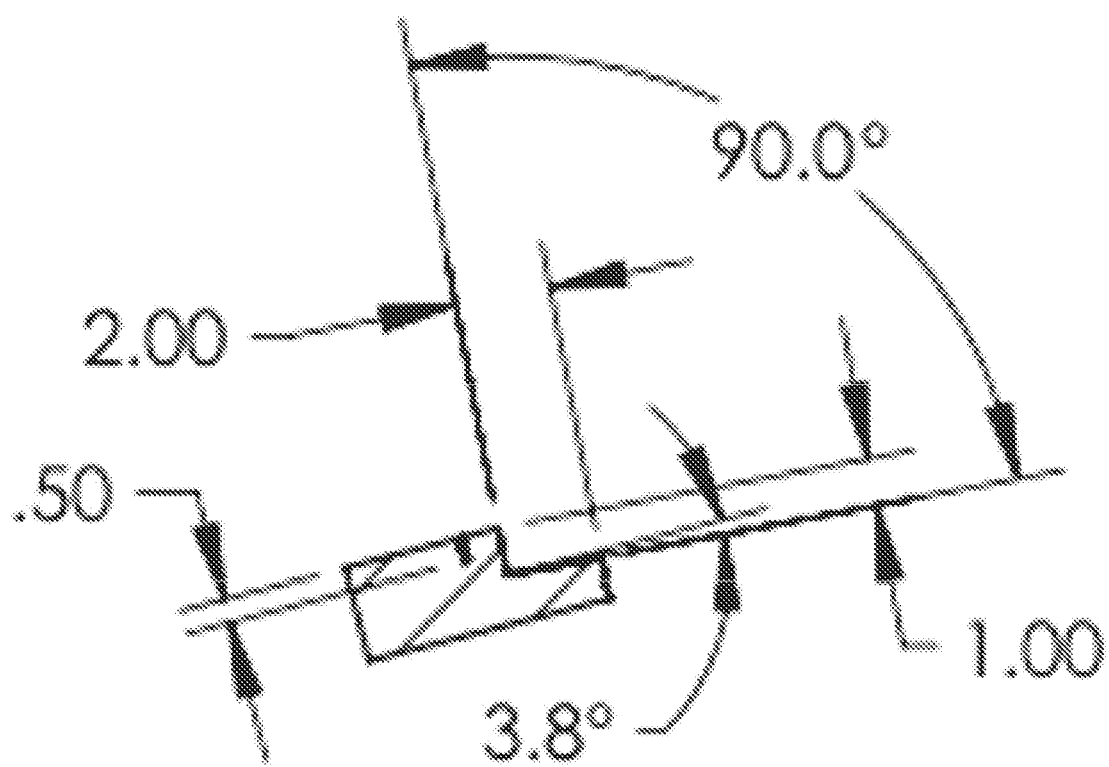
FIG. 7 is a cross-sectional view of an edge of the side panel taken along section A-A of the side panel of FIG. 6.
Figure 8:
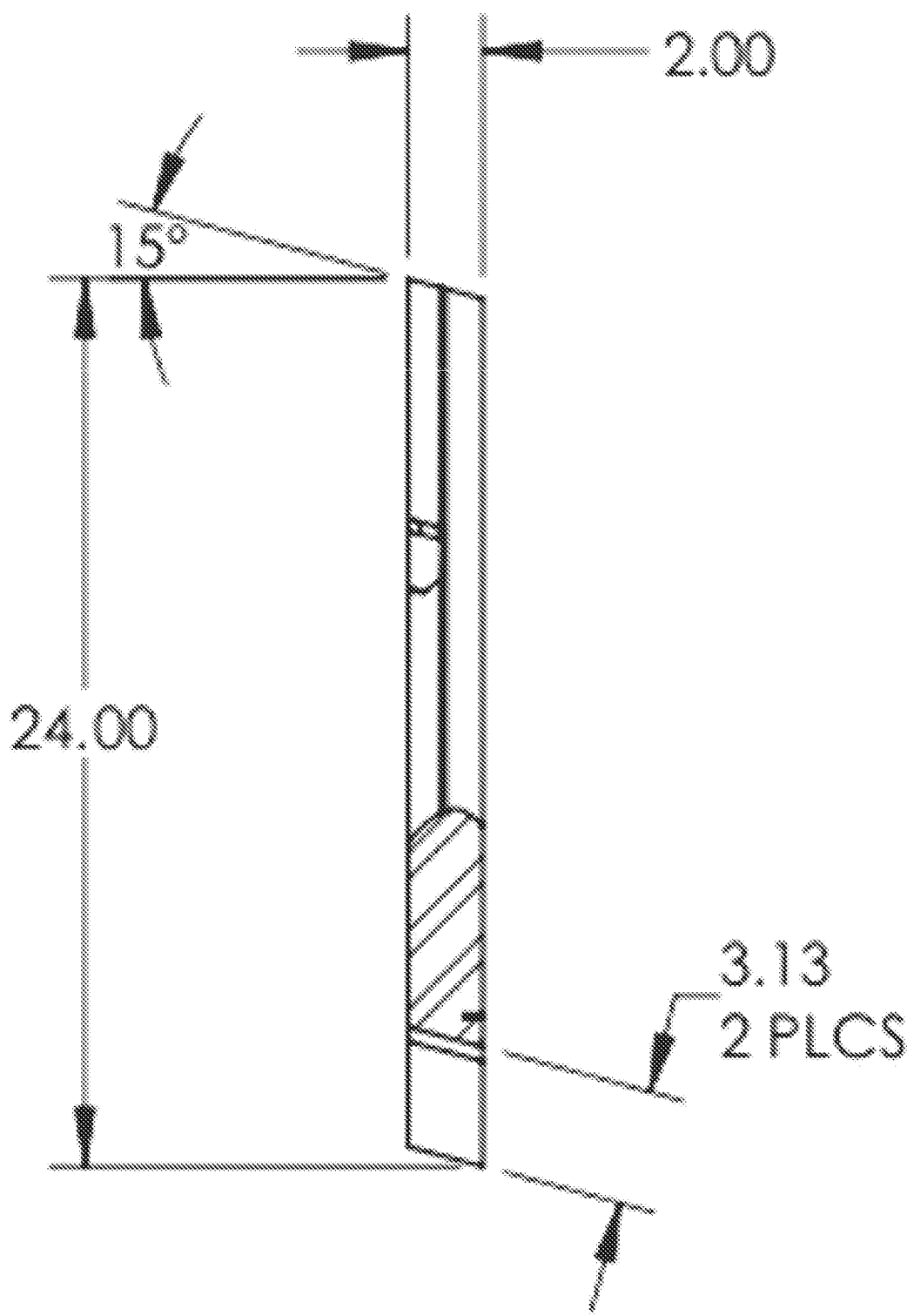
FIG. 8 is a side view of a side panel of FIG. 4.

FIGS. 1-3 are different views of an example tree box 100. In this example, the tree box includes a plurality of side panels 102. The side panels 102 can be connected together at edges to define an interior space for supporting a root ball of a tree therein. The sidewalls include bottom ends.

In some embodiments the tree box 100 is bottomless, but can include a removable bottom panel that can be arranged adjacent the bottom ends of the side panels 102. An example of the removable bottom panel is illustrated and described in further detail with reference to FIGS. 15, 28, 30, and 31.

FIGS. 4-8 are different views of the side pieces used to construct the tree box of FIG. 1-3. In this example, the tree box is made with four identical single piece machined high density polyethylene ("HDPE") sides.

Figure 9:
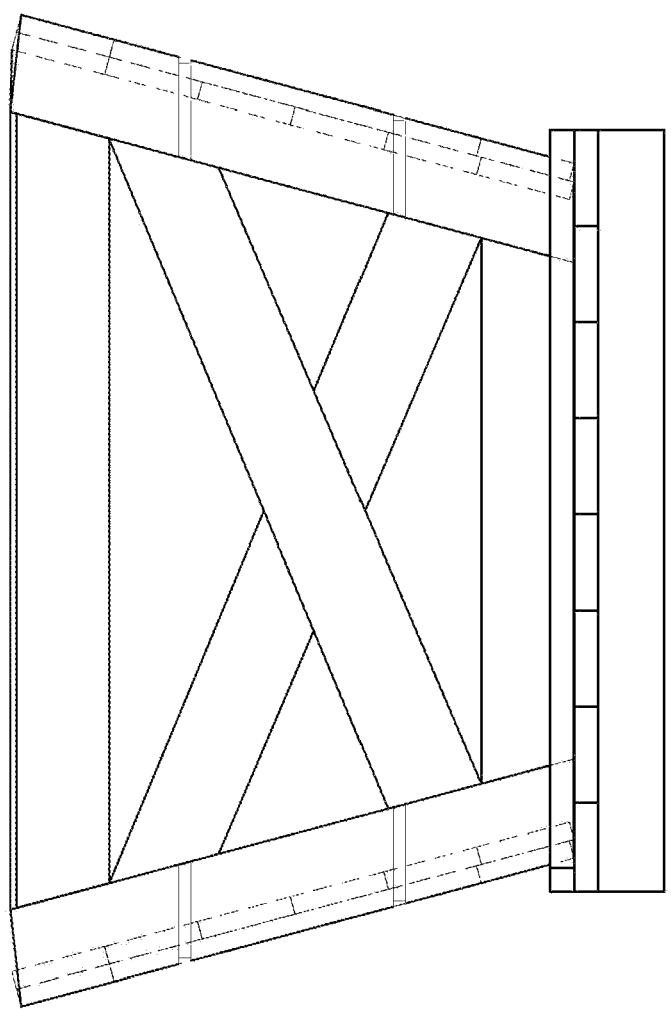
FIG. 9 is a side view of another example tree box.
Figure 10:
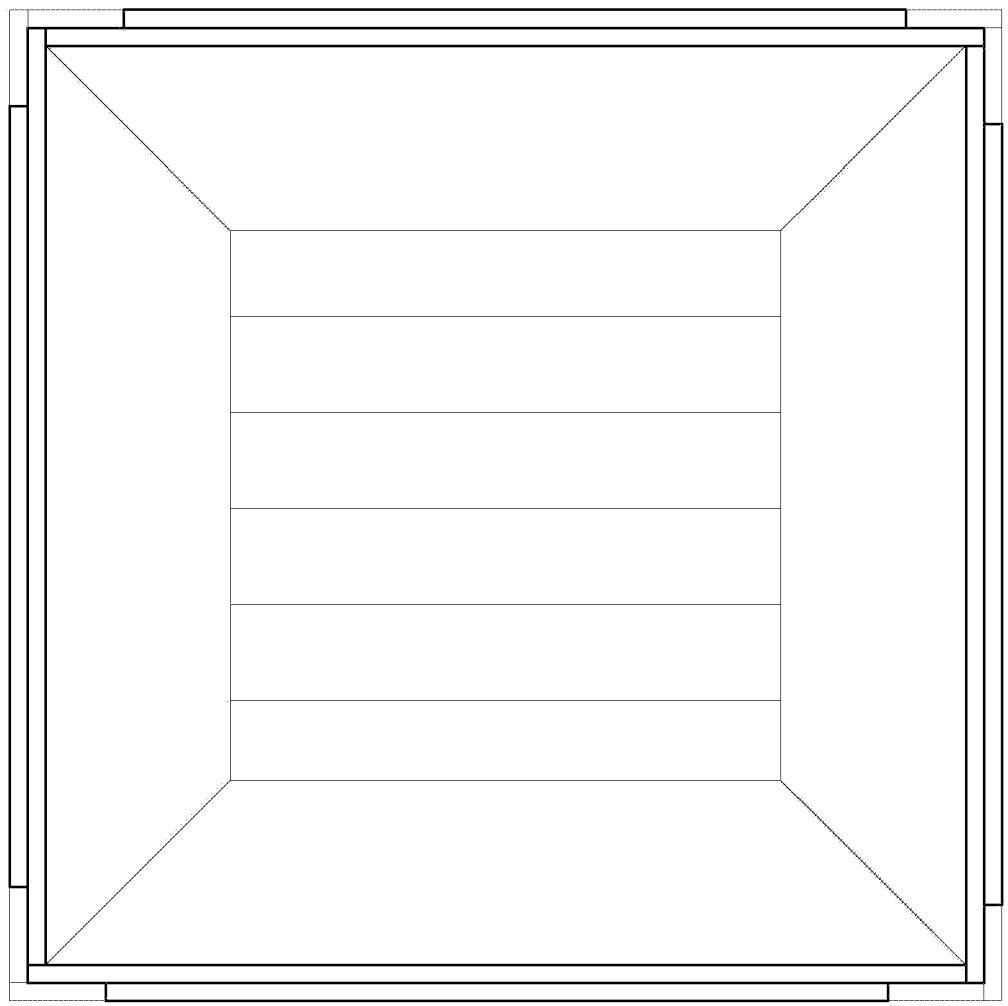
FIG. 10 is a top view of the example tree box in FIG. 9.
Figure 11:
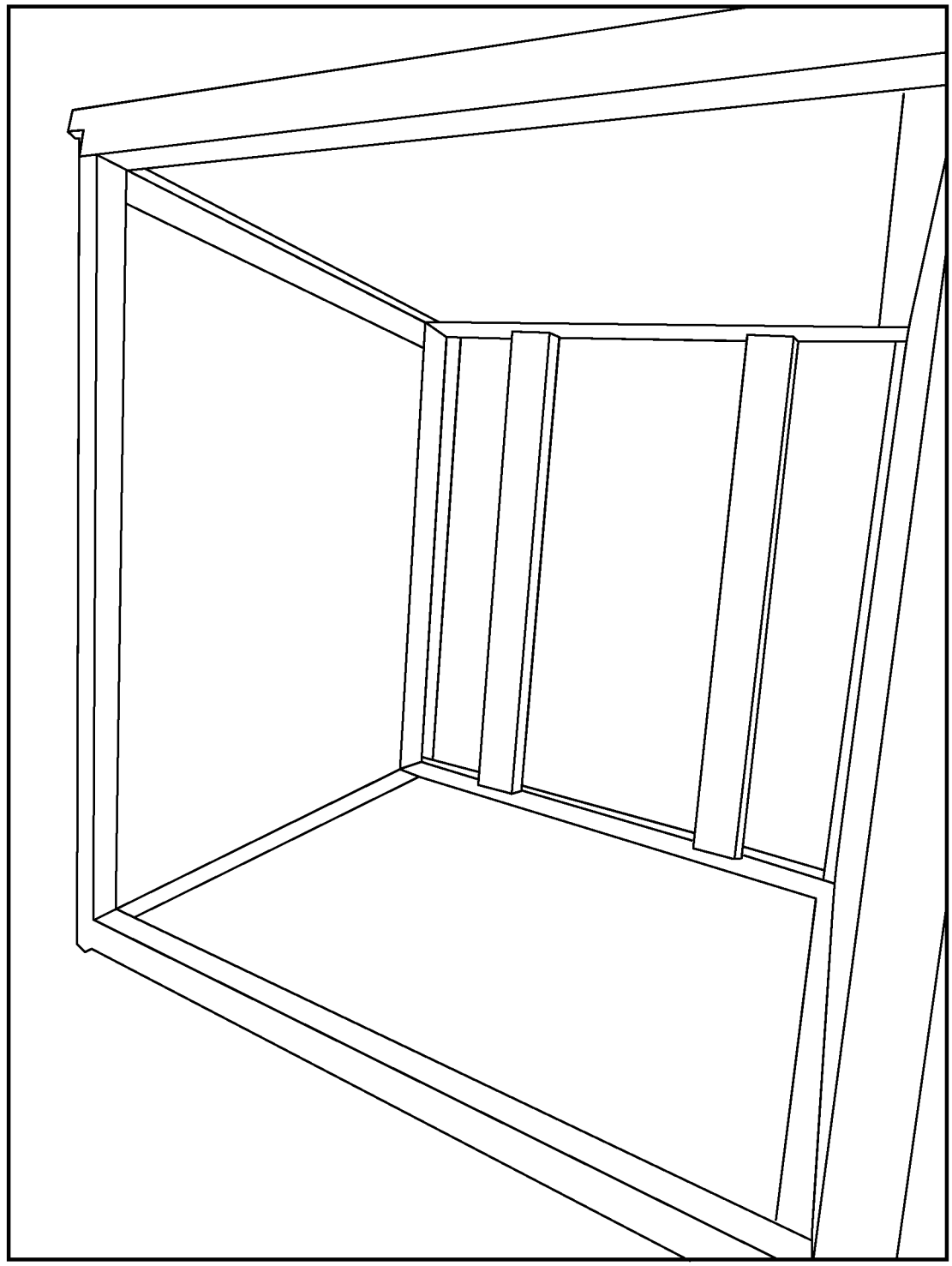
FIG. 11 is a perspective top view of the tree box of FIG. 1, including example forklift compatible lifting tubes, bottom panel, and root air pruning fabric within the body of the tree box.
Figure 13:
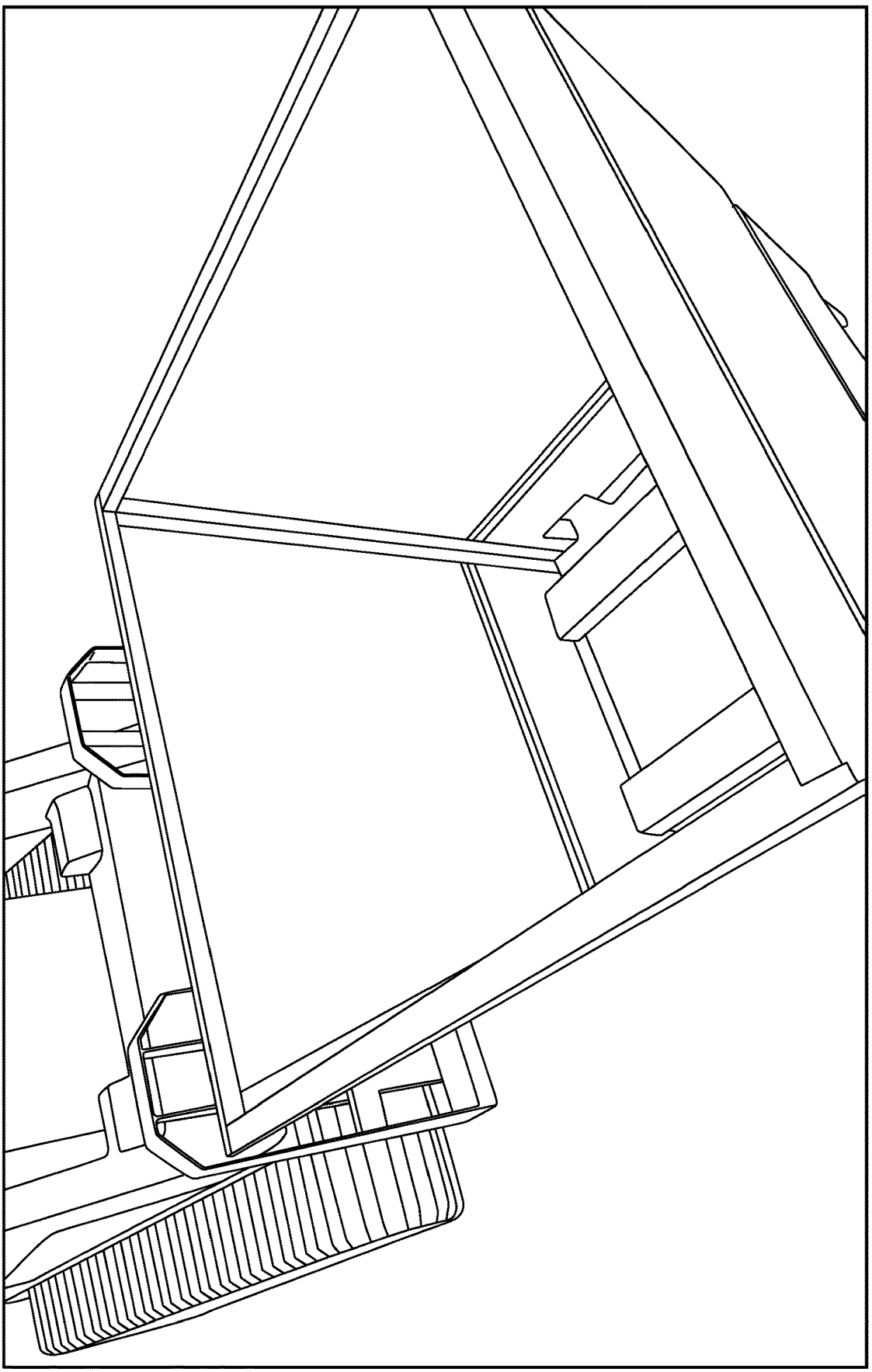
FIG. 13 is a perspective top view of another example tree box configuration including the side panels and forklift compatible lifting tubes set up in a bottomless configuration.

FIGS. 9-10 are different views of another example tree box. In the illustrated example, the tree box includes sides with dimensional HDPE pieces screwed together. For example, outside corner edges can be joined with a rabbet/rabbet joint, as depicted in FIG. 11, or a rabbet/butt joint, with one edge a rabbet joint and the other edge a butt joint that fits into the rabbet of the adjacent side, as depicted in FIG. 13.

How is it Used?

In one example, a nursery-grown tree is placed into the tree box (FIG. 19) and then grown larger, or the tree can be excavated around the parameter and the box is assembled around the tree for holding and transportation to a landscape project for planting. Some embodiments of the tree box have one or more of the following unique advantages:

Its design enables planting the tree without the box bottom.

Because of its structural design and materials it will not rot or breakdown from UV sunrays.

Figure 17:
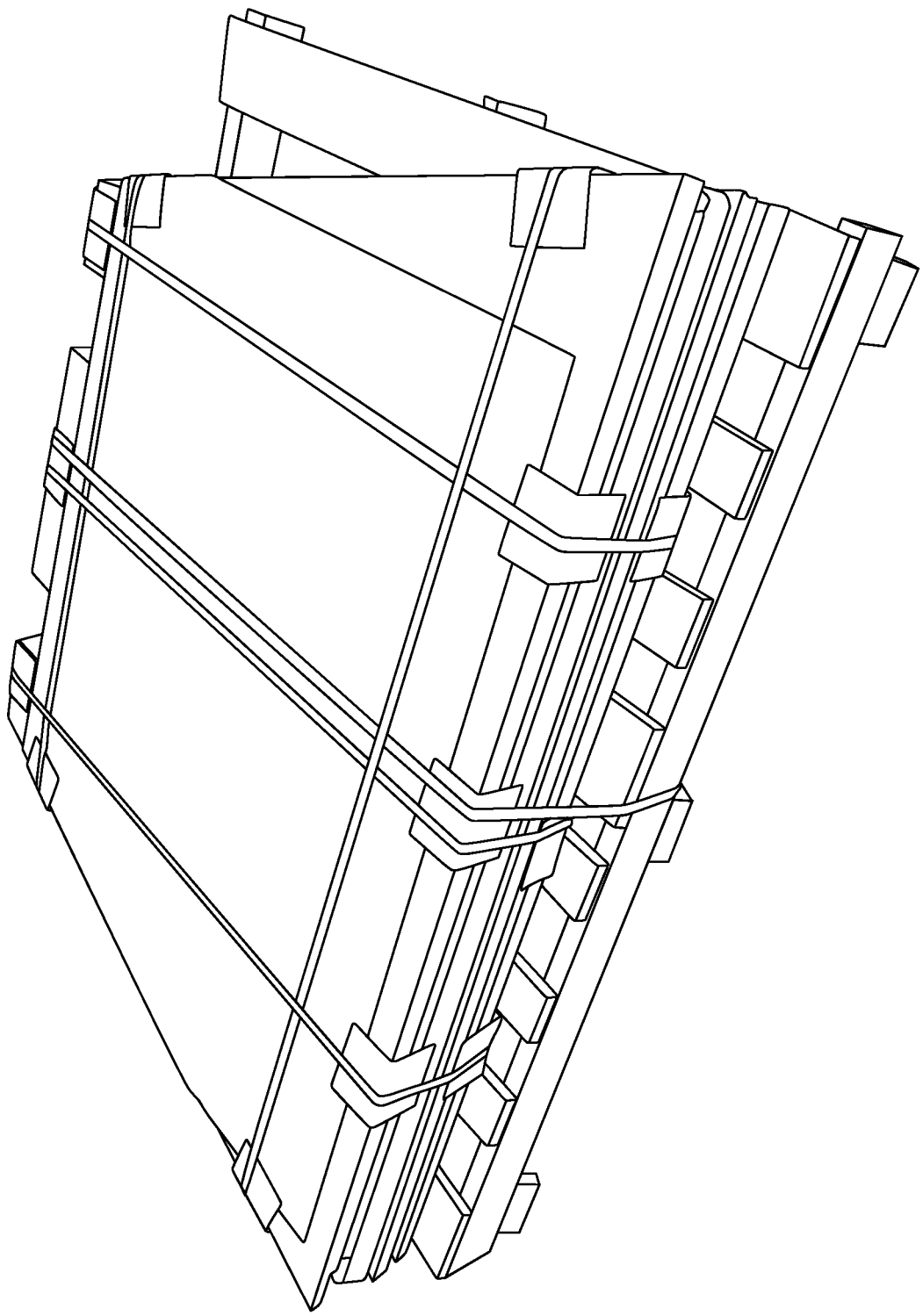
FIG. 17 is a perspective top view of the disassembled pieces of the tree box of FIG. 11, packed for shipping.

Re-usable, the design enables the tree box to be used many times. Return shipping is simple. (FIG. 17)

Figure 20:
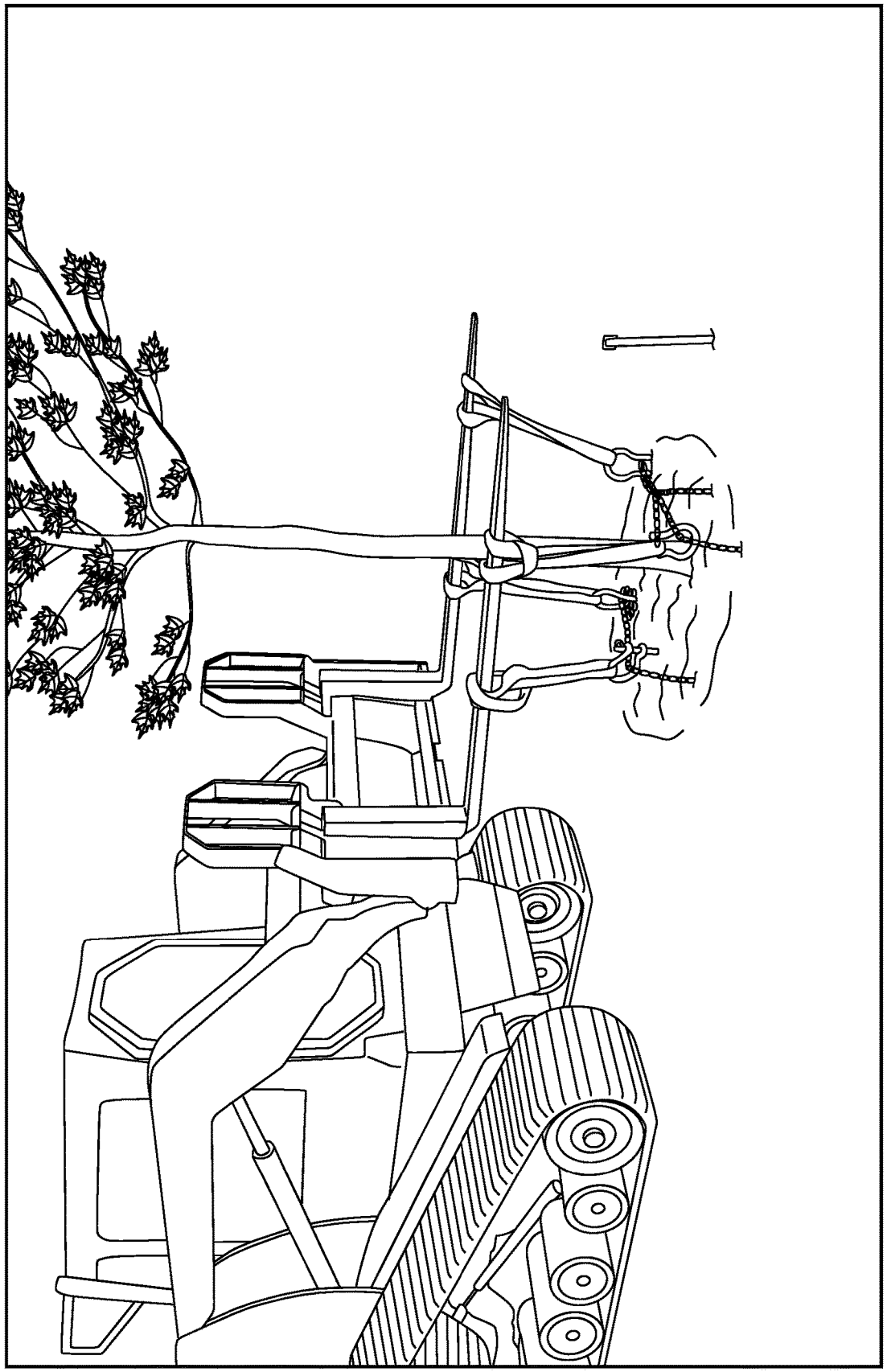
FIG. 20 is a perspective side view of a tree planted in the tree box of FIG. 11 before excavation.
Figure 21:
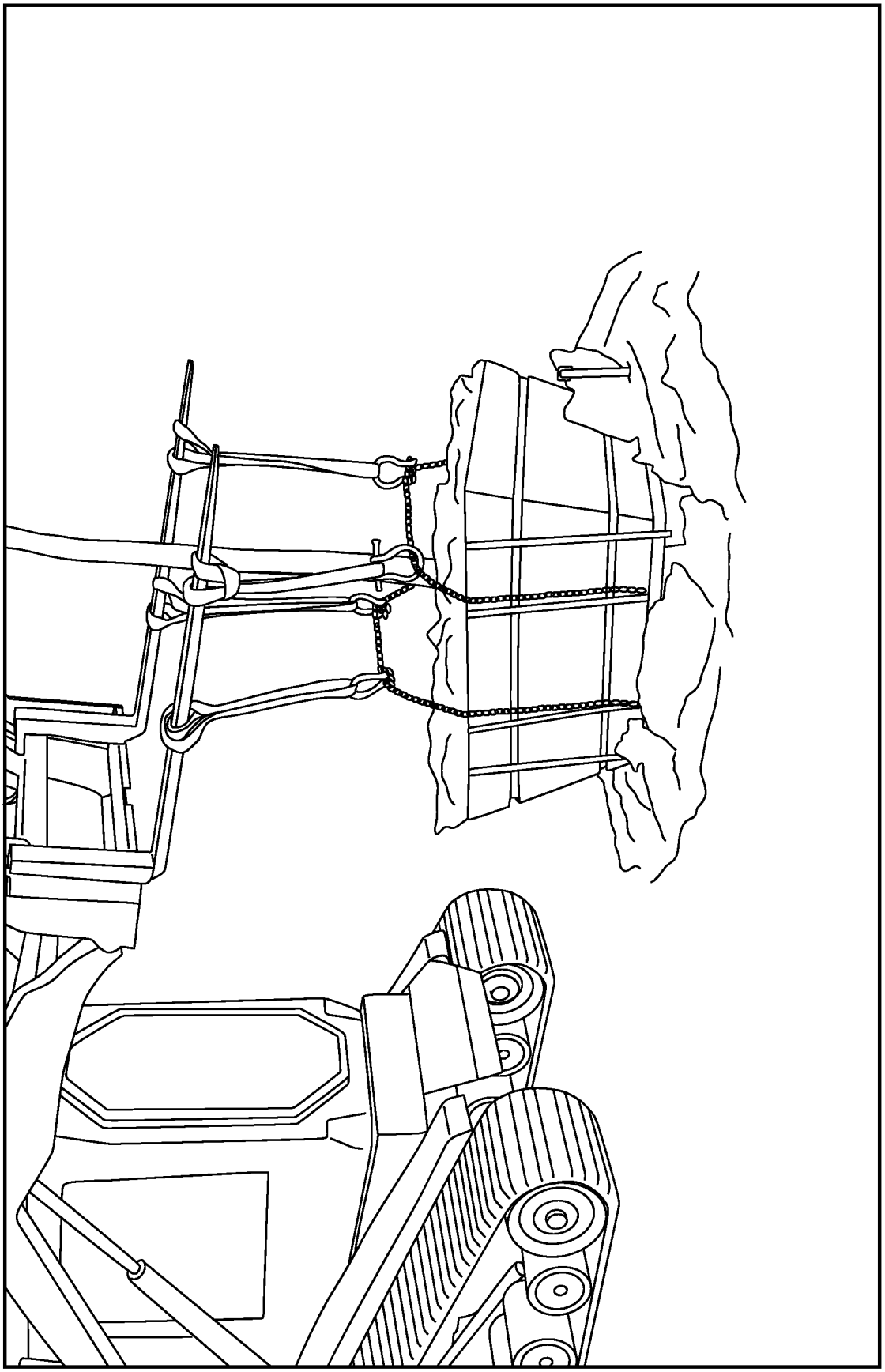
FIG. 21 is a perspective side view of the tree planted in the tree box of FIG. 11 while being excavated.
Figure 22:
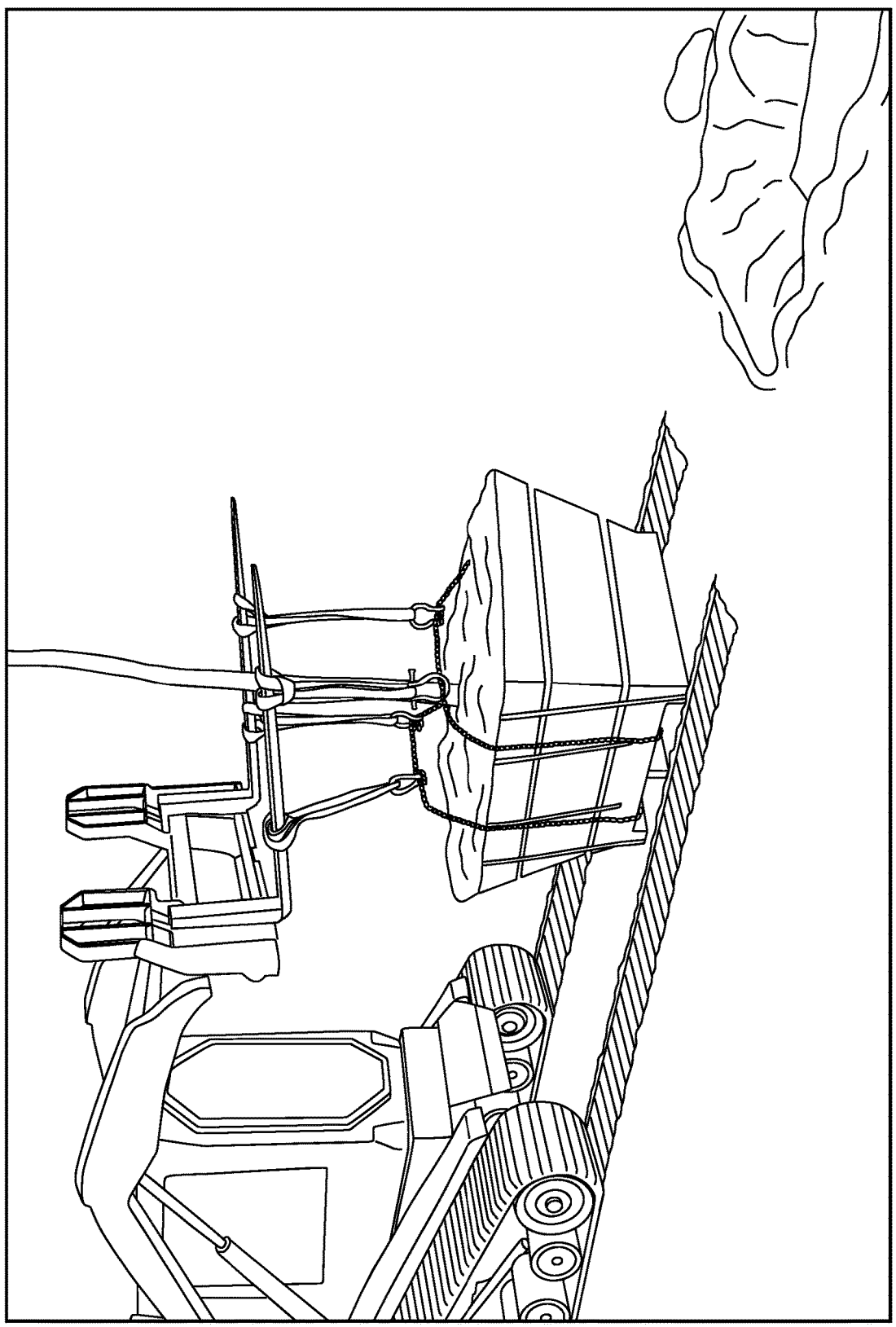
FIG. 22 is a perspective side view of the tree planted in the tree box of FIG. 11 after being excavated.
Figure 23:
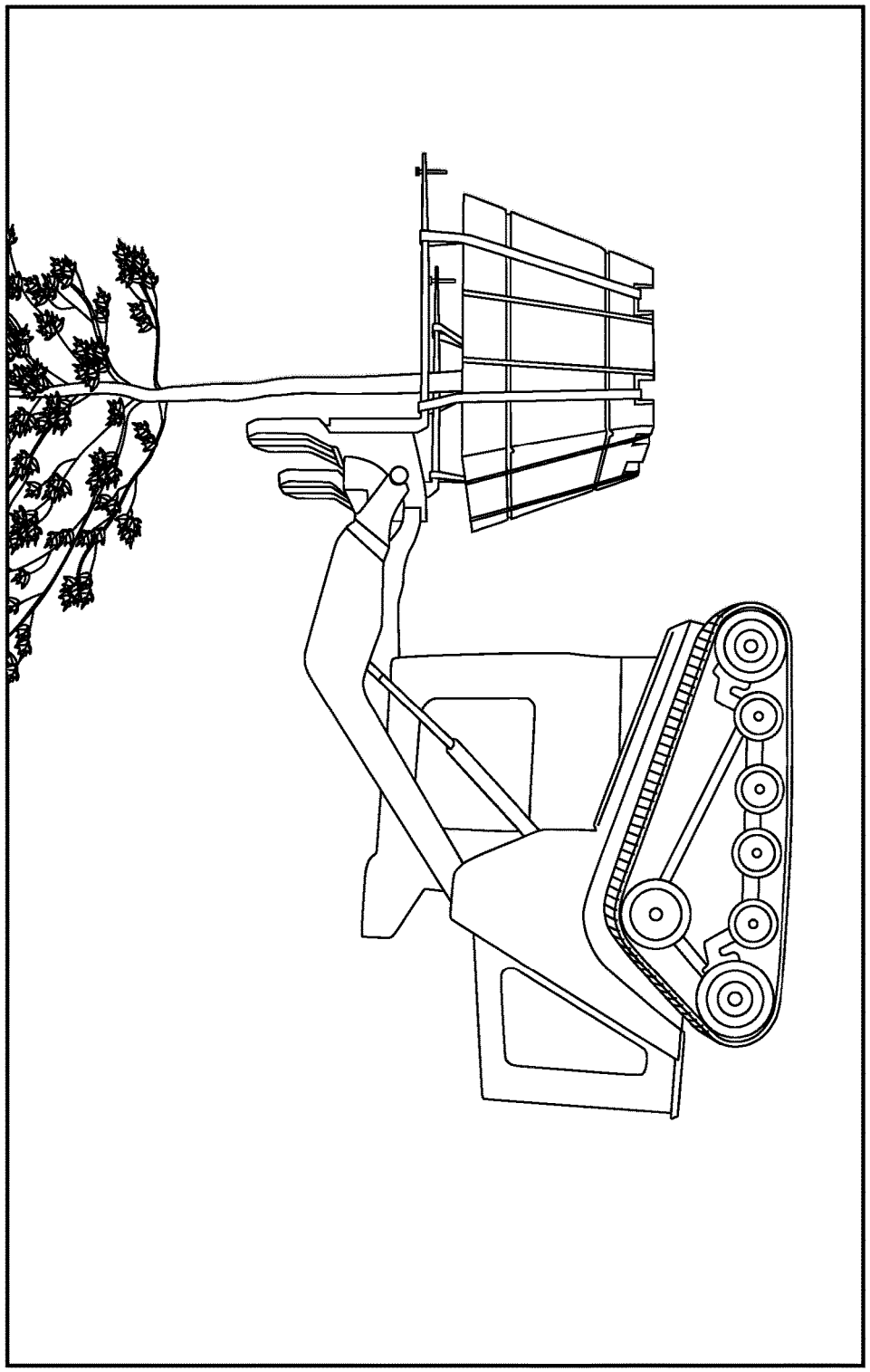
FIG. 23 is a perspective side view of an oak tree planted in the tree box of FIG. 11 being transported using straps to support the box through the forklift compatible lifting tubes.

The tree box design and smooth exterior allow the box to be direct buried for storage and growing healthy trees in-ground. This allows the tree to experience soil temperatures and moisture levels identical to being grown naturally in-ground. This produces a healthy tree that can be pulled out of the ground anytime of the season to be planted—even in the middle of a frozen Minnesota winter when the frost is 2 feet thick (FIGS. 20-22). The tree box enables planting of any tree, any time of year, no matter the conditions or specific tree variety limitations. Successful experimental trials have been performed with Oak trees, which are considered more difficult to transplant successfully, and it works well on Oaks (FIGS. 20-22).

Figure 24:
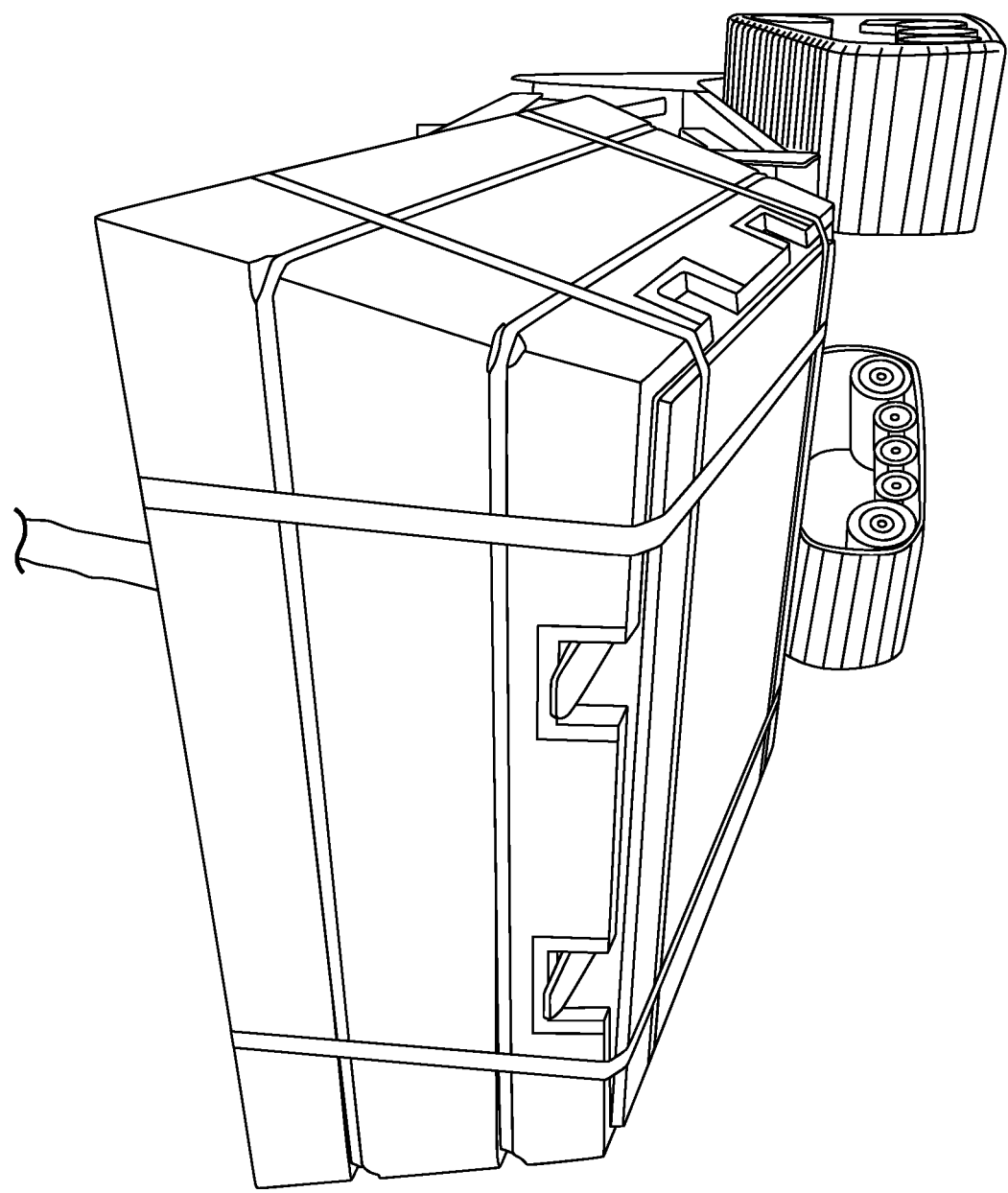
FIG. 24 is a perspective bottom view of a tree planted in the tree box of FIG. 11, carried by a forklift with its forks inserted directly through the forklift compatible lifting tubes.
Figure 25:
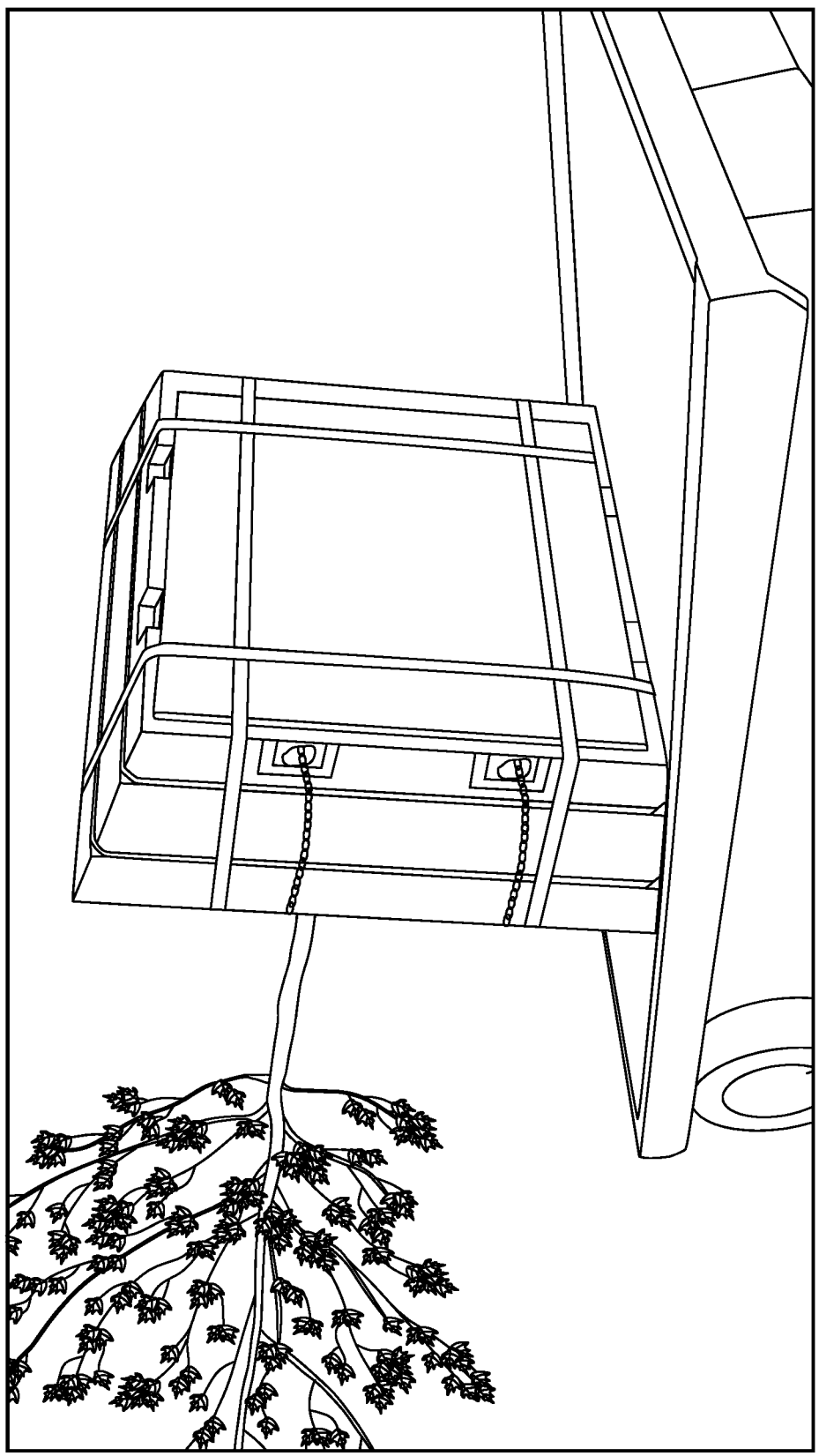
FIG. 25 is a perspective bottom view of a tree planted in the tree box of FIG. 11, loaded on its side onto a trailer.
Figure 26:
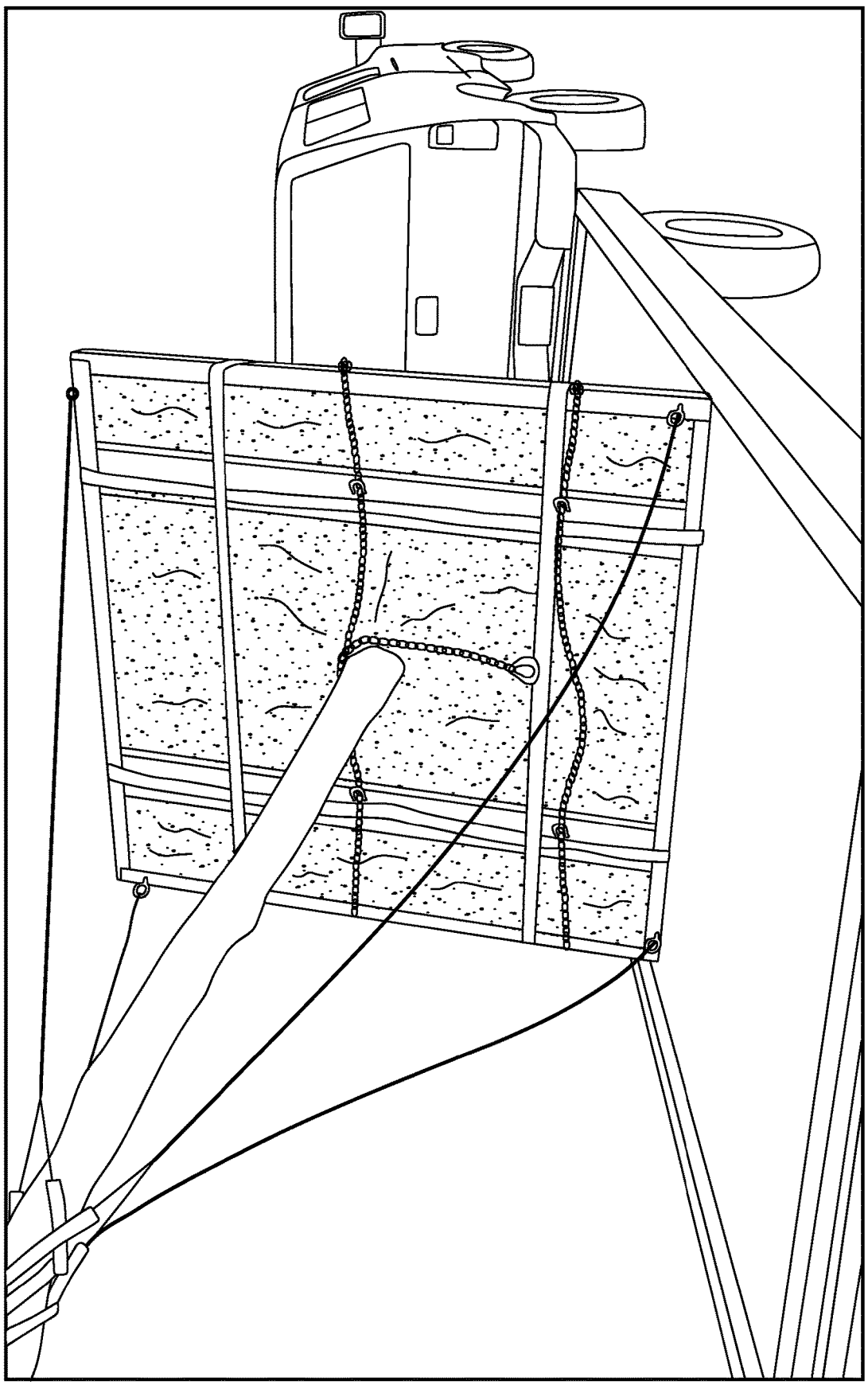
FIG. 26 is a perspective top view of an oak tree planted in the tree box of FIG. 11, loaded on its side onto a trailer.

Handling and transporting trees in the tree box is easy, safe, and keeps the root system of the tree intact and protected from getting smashed, dried out, and damaged. The combination of rigid design, detailed machining of parts, and forklift compatible lifting tubes at the bottom are present in some embodiments (FIGS. 23-26). The forklift compatible lifting tubes allow for transporting with straps (FIG. 23) or direct engagement with forklift tips (FIG. 24). Transporting of large trees in tree boxes can be done with less skilled labor and commonly owned lower cost machinery. The geometry of the tree box and lifting tubes also allows for an easier roll-over process during transportation FIGS. 25-26). Tilted storage is critical for tree transportation so that the cargo height remains under typical roadway height requirements. The lifting tubes can also be used to aid in securing the tree box to a trailer.

Size

Size is referred to by length and width of the horizontal soil area when the box is filled to the top. Most boxes have equal length and width (square) so only one dimension may be used to describe it, i.e.: 5 feet, however rectangle shaped boxes (or other shapes, e.g., triangle, pentagonal, or even circular (preferably with at least one flat surface)) can be used for special applications. Depth (height) of the box is also flexible depending on the application needed. The tree box shown in at least some of the figures is: 5 feet by 5 feet by 2 feet deep, as an example.

Basic Structural Components:

Four side panels: In some embodiments the sides are made of plastic, such as HDPE. The sides are preferably in a range from two to four inches thick, though other thicknesses can be used in other embodiments. In some embodiments each of the sides is identical in shape and size.

Bottom panel: In some embodiments the bottom panel is made of wood or plastic, such as HDPE. In some embodiments, the bottom panel may also be lined with air root pruning fabric. The bottom panel may also have notches cut out for support blocks used when separating the bottom during planting (FIGS. 15, 28, 30, and 31).

Other possible components include one or more or combinations of the following:

Treated decking, such as 1 inch by 6 inch boards;
Spray adhesive, such as 3M Hi-strength 90;
Aluminum step edge;
Carpet edge;
Air pruning fabric, such as Rootmaker on the sides and bottom;
Fasteners, such as screws, some embodiments may use outdoor course 1.25 inch, while other embodiments, such as boxes using dimensional HDPE, may use 3 inches or greater;
Forklift compatible lifting tubes, for example, formed out of steel or extruded fiberglass or aluminum;
Strapping, such as 1.25 inch or 0.75 inch galvanized or stainless steel or 1.5 inch poly cord with buckles;
Plywood, such as 0.75 inch treated;
Chain, such as 0.375 inch or 0.3125 inch grade 70, or lifting straps;
Dirt, such as Quality Growers Mix;
Lumber, such as dimensional wood lumber which may be used for buryable bottom and bracing.

Construction Material and Methods

In some embodiments the sides are constructed with HDPE plastic. Sides can be made in two ways, for example: (1) Dimensional pieces of HDPE (FIGS. 9-10) and screws; or (2) a single piece of HDPE CNC cut per the design as shown (FIGS. 1-8).

Figure 34:
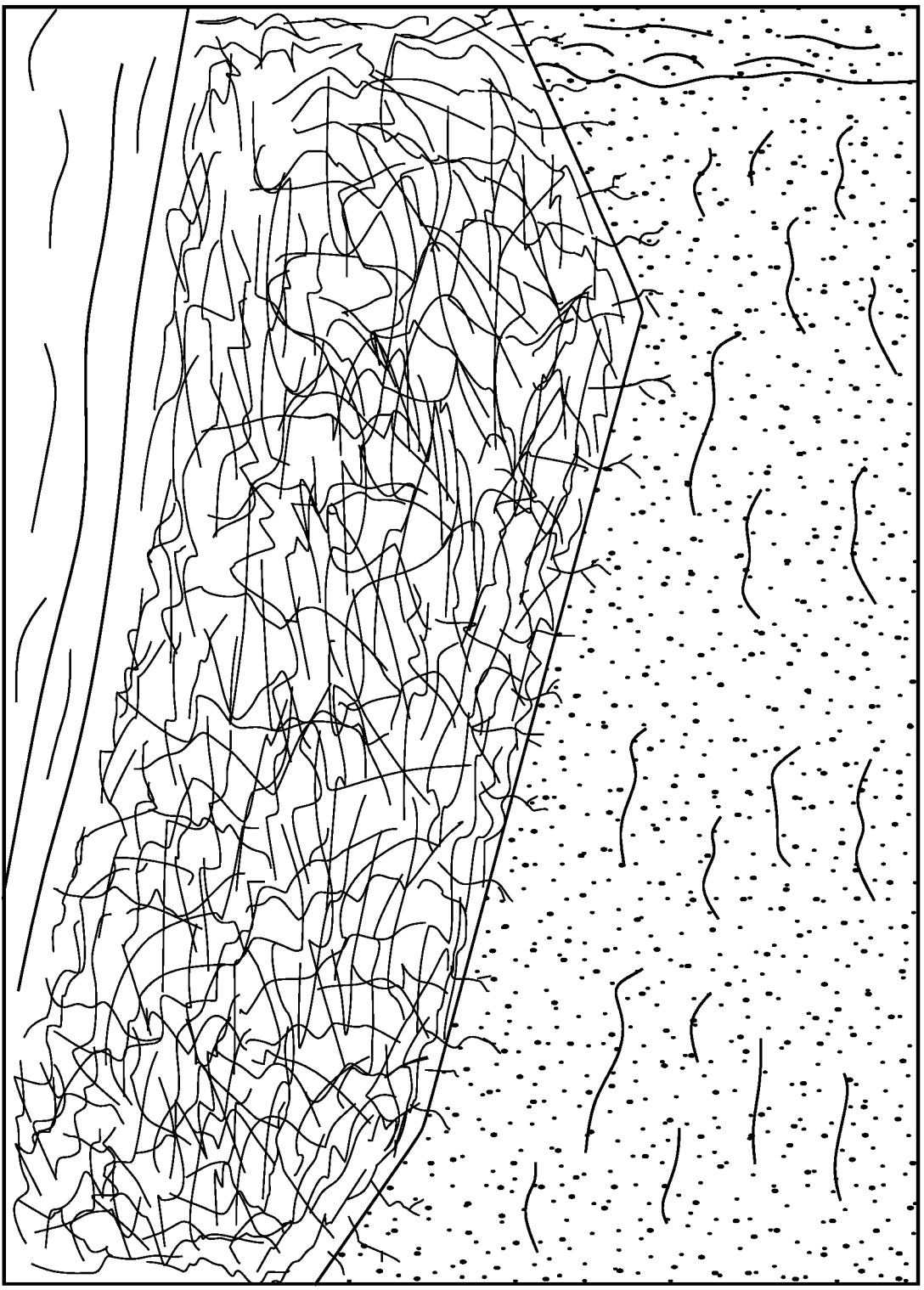
FIG. 34 is a perspective bottom view of a tree base after being removed from the tree box of FIG. 11, showing millions of fibrous healthy roots.
Figure 36:
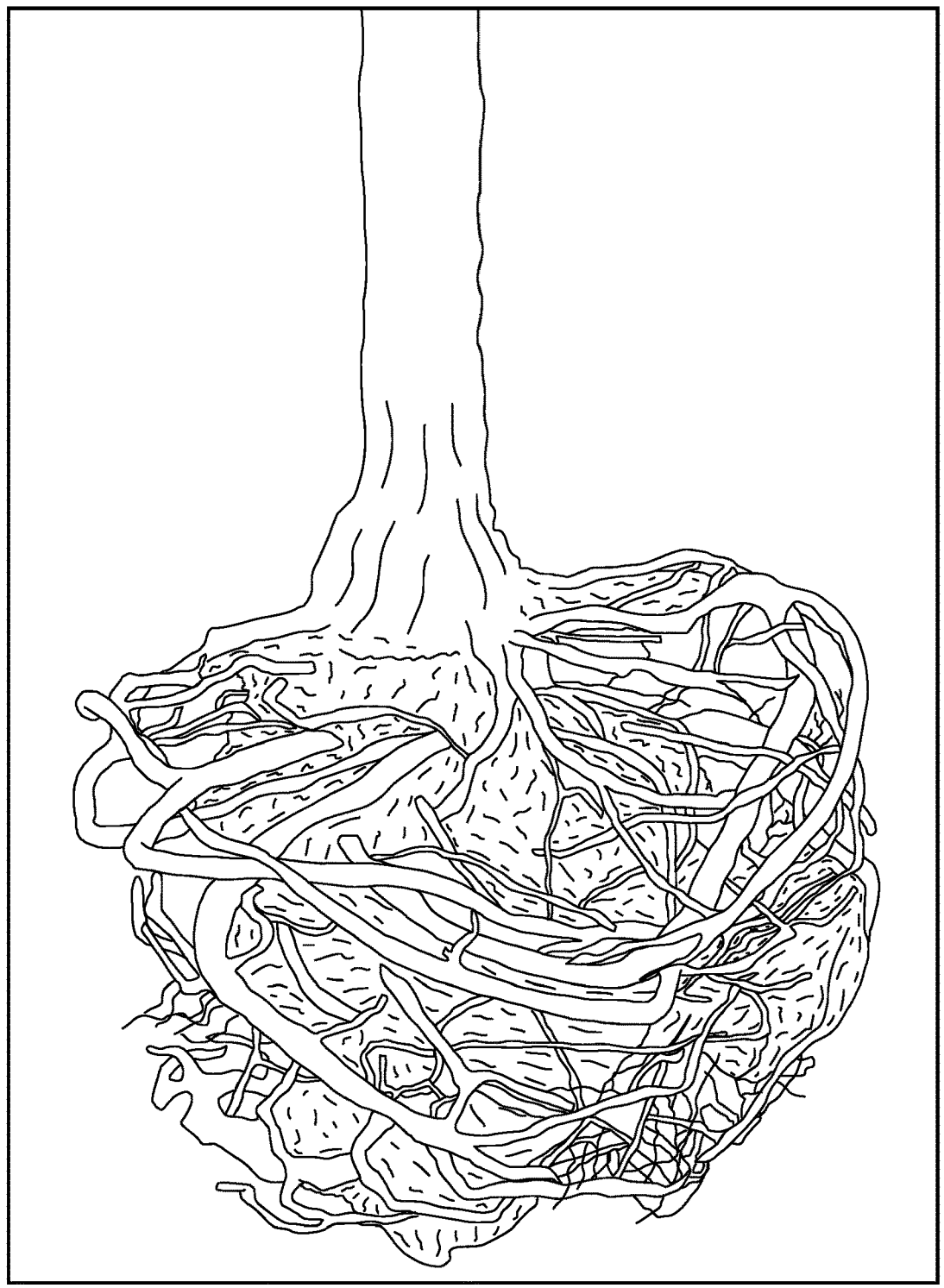
FIG. 36 is a perspective side view of an unhealthy circling or girdling tree root system formed after not using the root air pruning fabric of FIG. 11.

If box is intended to be used as a growing box for more than one season, air root pruning fabric is used on the inside of each side (FIGS. 11, 13, 14, 15, and 16) so when tiny roots grow and touch the side they are air pruned and cause more fibrous healthy roots to develop (FIG. 34) instead of circling around the box, growing larger, and causing a less desirable root system that can ultimately kill the tree (FIG. 36). Air root pruning fabric can be attached to the sides with strips of aluminum and fasteners. In another possible embodiment, a "sock" formed of root pruning fabric can be provided having a shape that matches and covers the interior surfaces of the tree box, such as having at least four sidewalls that cover interior sidewalls of the tree box.

Figure 14:
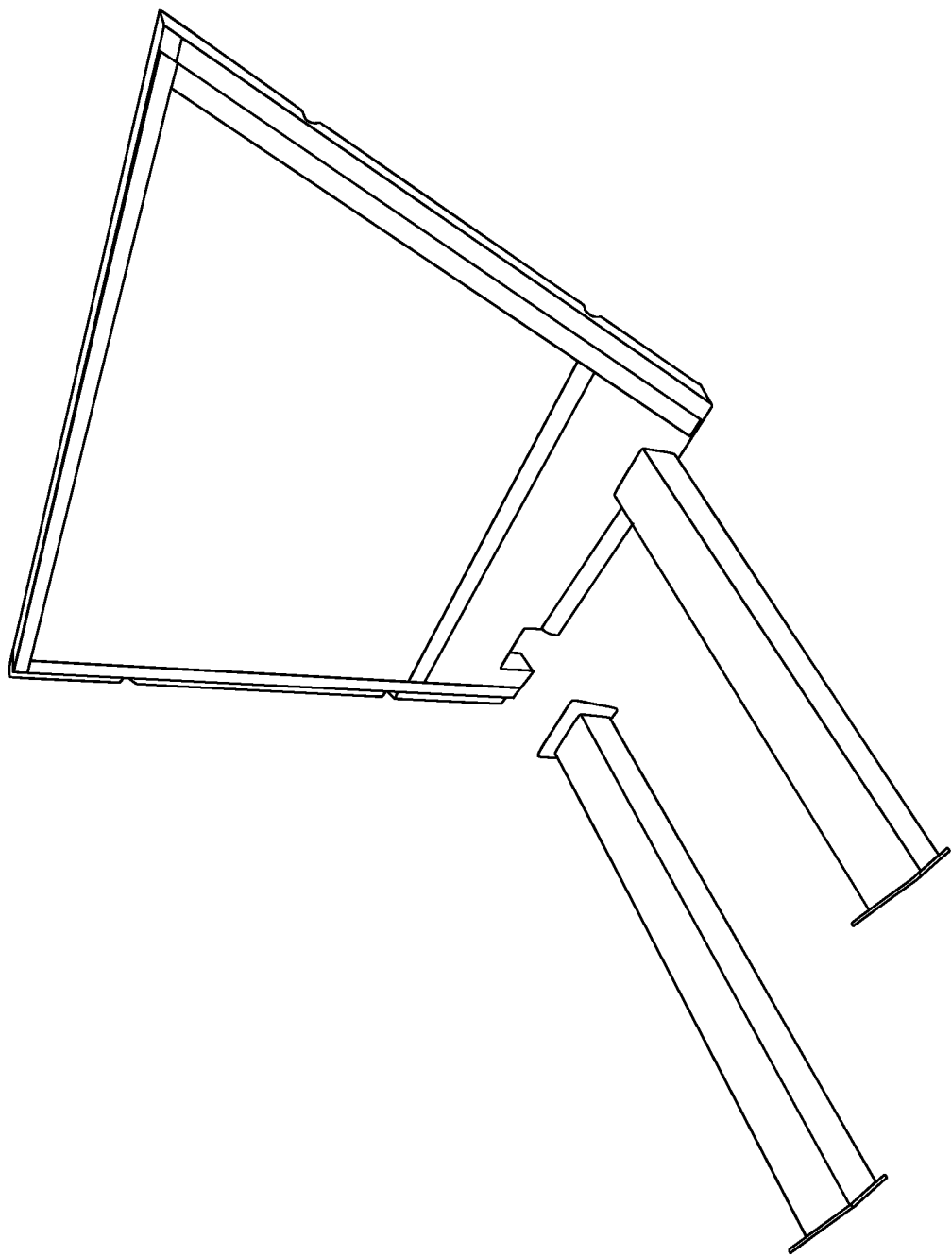
FIG. 14 is a perspective side view of a side panel of the tree box and forklift compatible lifting tubes of FIG. 13.

Forklift compatible lifting tubes fit into side panel notches and are not mechanically attached to the tree box aside from strapping. The tubes are cut at an angle and can include flanges in some embodiments, which help add extra support on the box edge (FIGS. 13 and 14).

Figure 32:
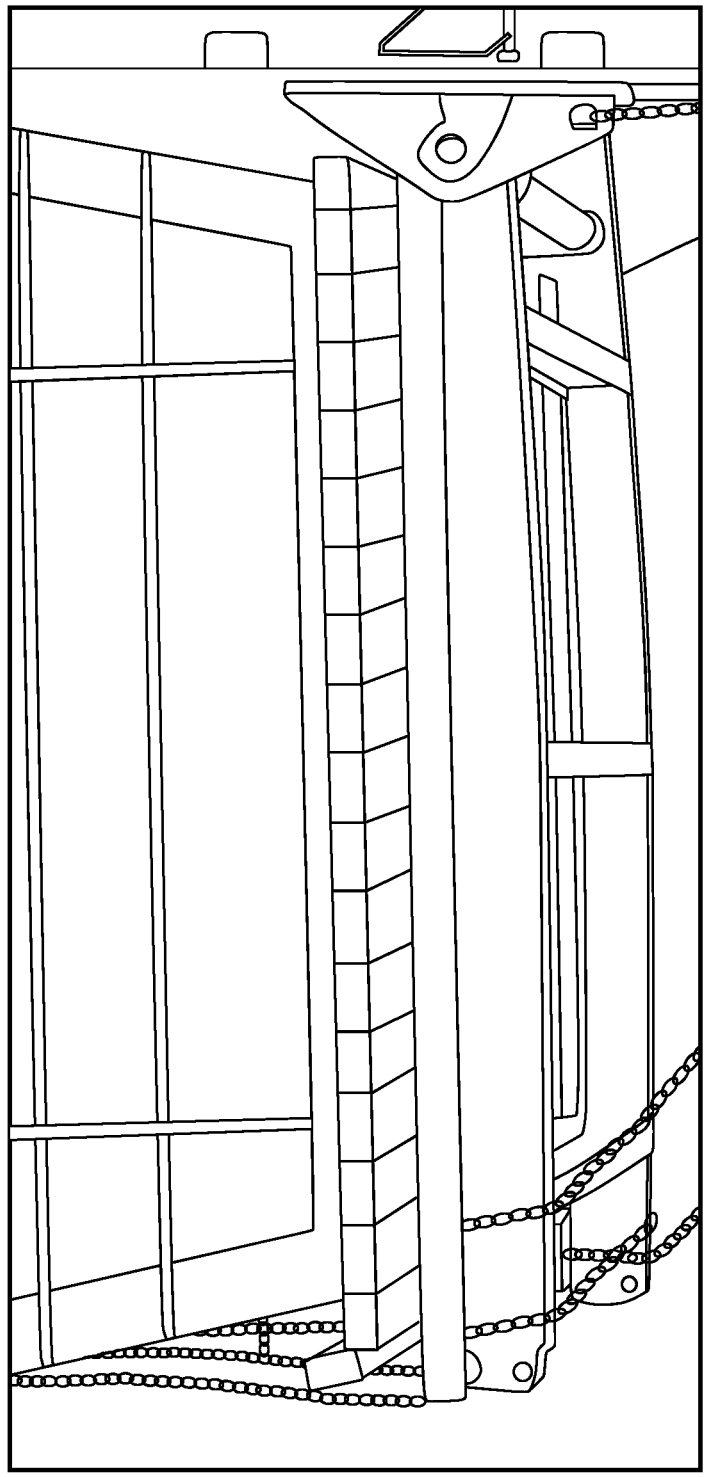
FIG. 32 is a perspective side view of the tree box of FIG. 9 with a dimensional wood lumber bottom.

The bottom can be constructed in various ways. Three example embodiments include:

(1) Traditional wood dimensional lumber—only if the bottom is intended to be left in the ground, planted with and under the tree. This method is not recommended but an option if the circumstances of the project dictate this strategy like transplanting extremely large trees, for example. (FIG. 32).

(2) Forklift compatible pallet—This HDPE option is used if the circumstances of the project dictate this strategy such as very tight conditions or if the tree is being used for display purposes or needs to be moved frequently. The sides can be set flat on top of the pallet for shipping back to be used again. (FIGS. 12 and 17).

(3) Bottomless—This option uses forklift compatible lifting tubes and is ideal as there is no physical barrier between the root system and the earth at the planting site. The tree box design enables the installer to remove the bottom permitting direct root ball to earth contact. The planting process (FIGS. 13, 14, 15, 16, 18, 19, 27, 28, 29, 30, 31, 33, and 35) describes how the bottomless embodiment is used to transplant a tree.

Figure 12:
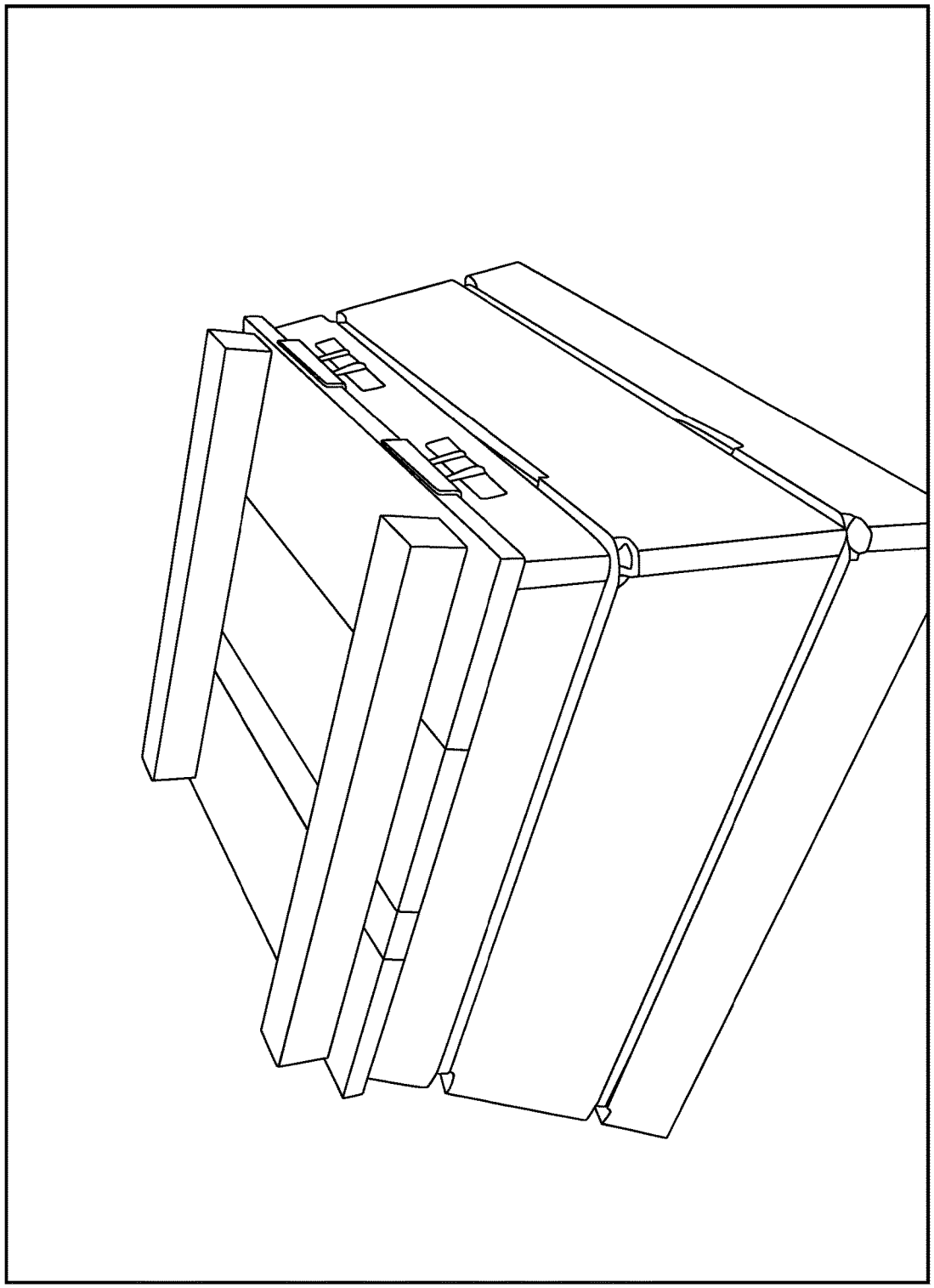
FIG. 12 is a perspective bottom view of another example bottom, able to be used with the tree box of FIG. 1.

FIG. 12 shows another alternative design of a tree box that does not include forklift compatible lifting tubes.

FIG. 13 is an example assembled bottomless tree box. In the illustrated example, the tree box includes forklift compatible lifting tubes nested within lifting tube notch cutouts at bottom ends of at least two of the tree box sidewalls. The assembly can be held together with horizontal straps around the exterior in which it would require no screws or other mechanical fasteners. In some embodiments, the edge profile of the side panels allows for a 15 degree side angle.

FIG. 14 depicts a bottomless tree box side and lifting tubes prior to assembly of the tree box of FIG. 13. As illustrated, the lifting tubes can be configured to engage with notches cut out from the bottomless tree box side. Air root pruning fabric can line the inside surface of all four sides. Lifting tube ends can be cut at 15 degrees and may include flanges added on the ends for extra support. For example, the lifting tubes may be constructed out of 3/16 or 1/4 inch steel or heavy wall extruded fiberglass or aluminum.

Figure 15:
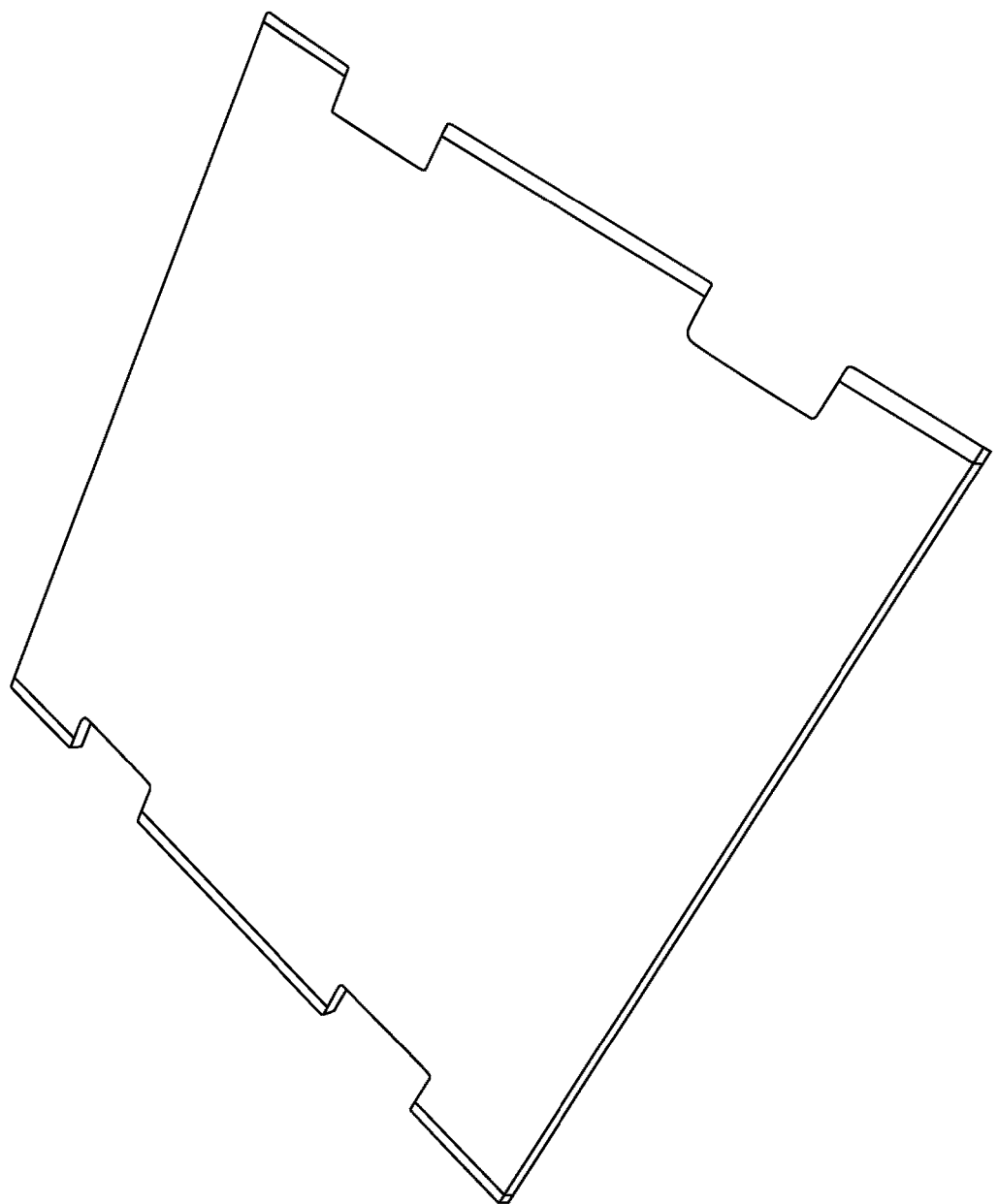
FIG. 15 is a perspective top view of another example bottom that could be used with the tree box of FIG. 1.

FIG. 15 is an example bottom panel used when transporting trees with the tree box of FIG. 13. The bottom panel can be wrapped with air root pruning fabric that may be glued or tacked in place. For example, the panel may be constructed from dimensional wood, HDPE lumber, or plywood. As seen in FIG. 15, the panel may include notches used to separate the bottom from the box when planting.

Figure 16:
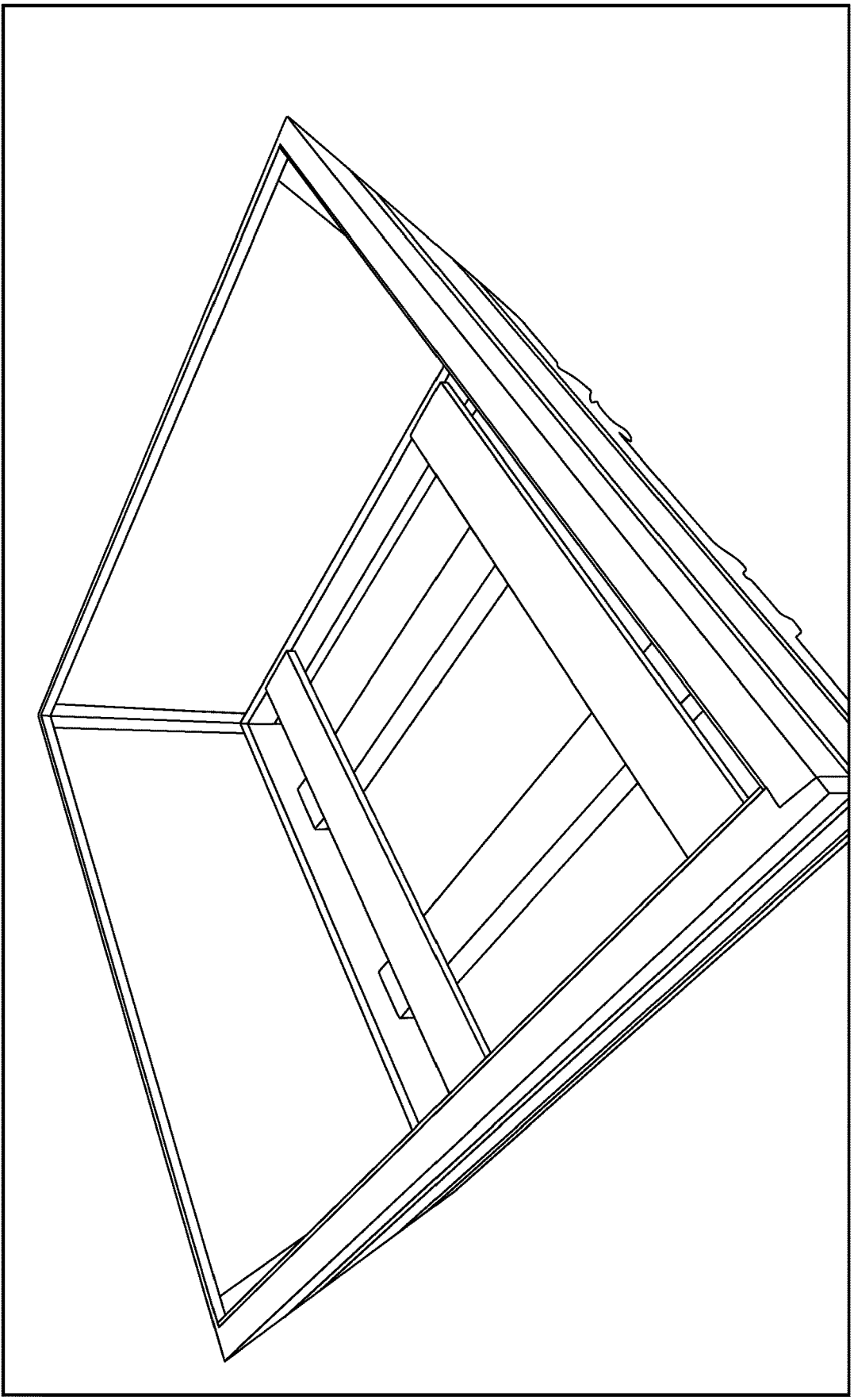
FIG. 16 is a perspective top view of another example tree box configuration with example side panels, forklift compatible lifting tubes, and wooden boards placed on top of the lifting tubes of FIG. 15.

FIG. 16 is another example of a tree box assembled on top of the panel of FIG. 15. Support boards shown may be added across the top of the lifting tubes to provide added support if the growing time is short and the roots don't have time to fill the box. The support boards may be planted with the tree.

Figure 18:
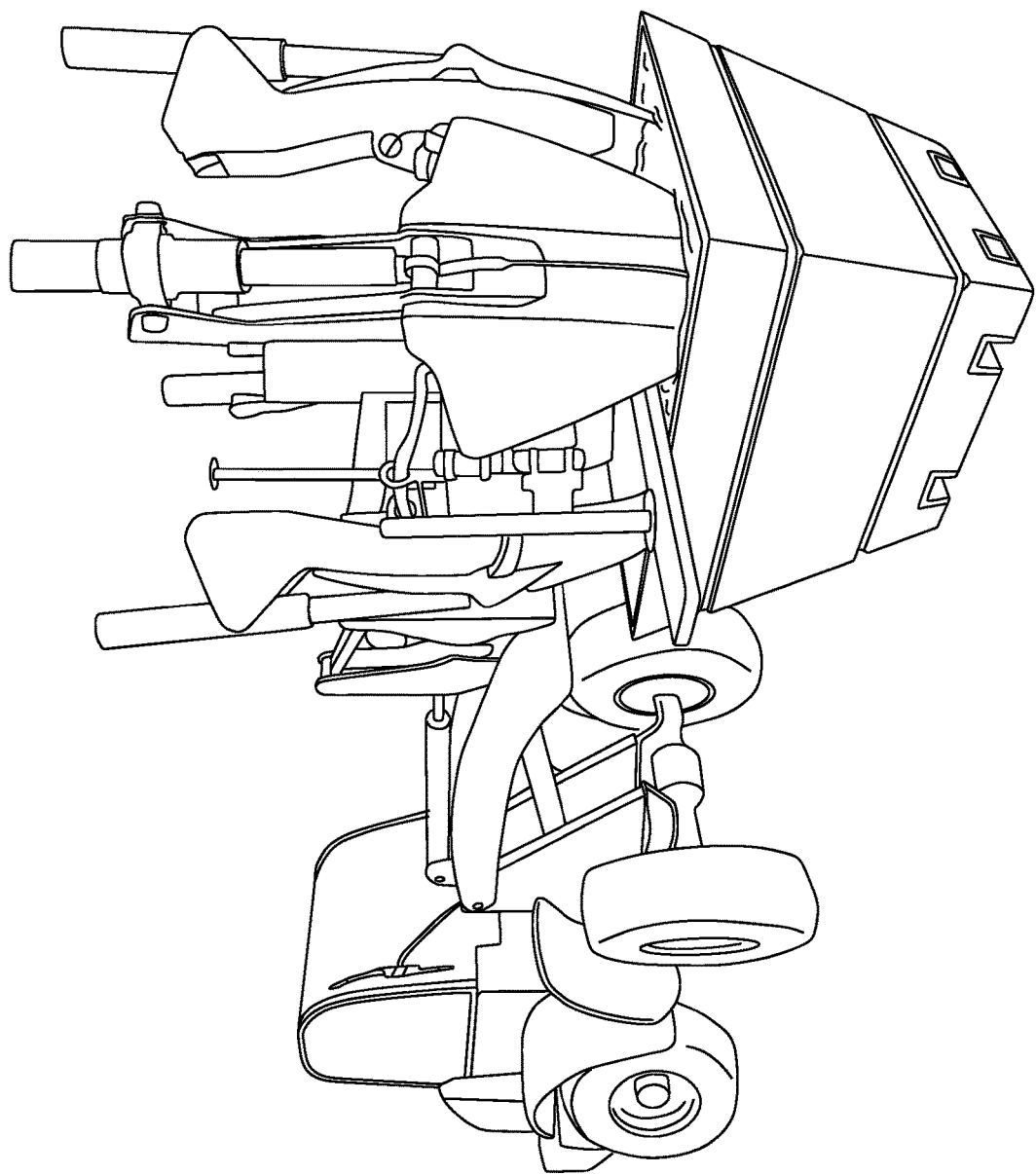
FIG. 18 is a perspective side view of a hole being dug into the soil filled tree box of FIG. 16.

FIG. 18 is a tree box assembly like FIG. 16 that has been filled with dirt. This example depicts the plug hole for the tree which may be dug with the same spade that the tree is field dug with.

Figure 19:
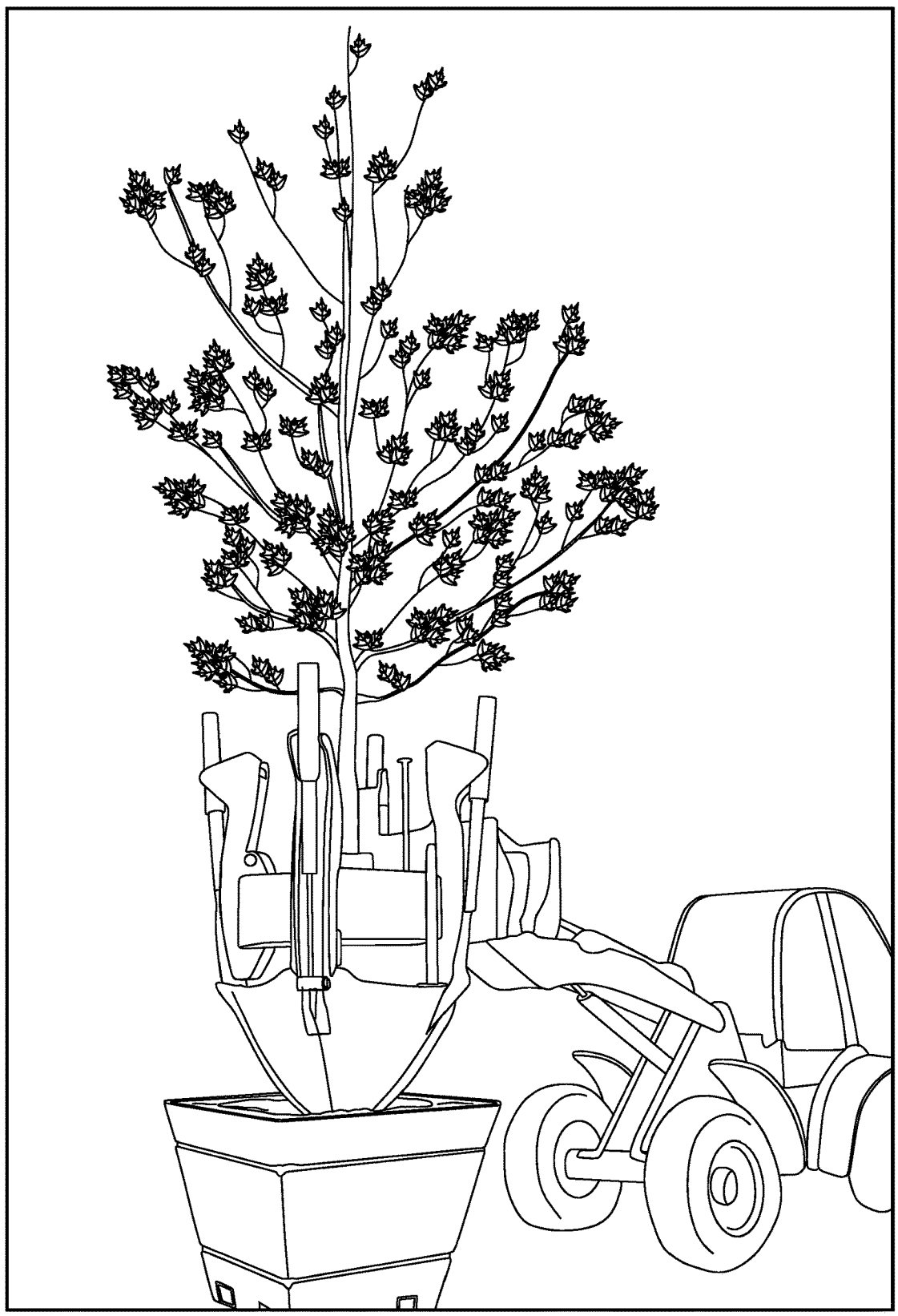
FIG. 19 is a perspective side view of a tree being planted in the soil filled tree box of FIG. 18.

FIG. 19 is a tree being placed into the tree box assembly of FIG. 18. The tree may be dug with the same tree spade that the tree plug hole is dug with.

Figure 27:
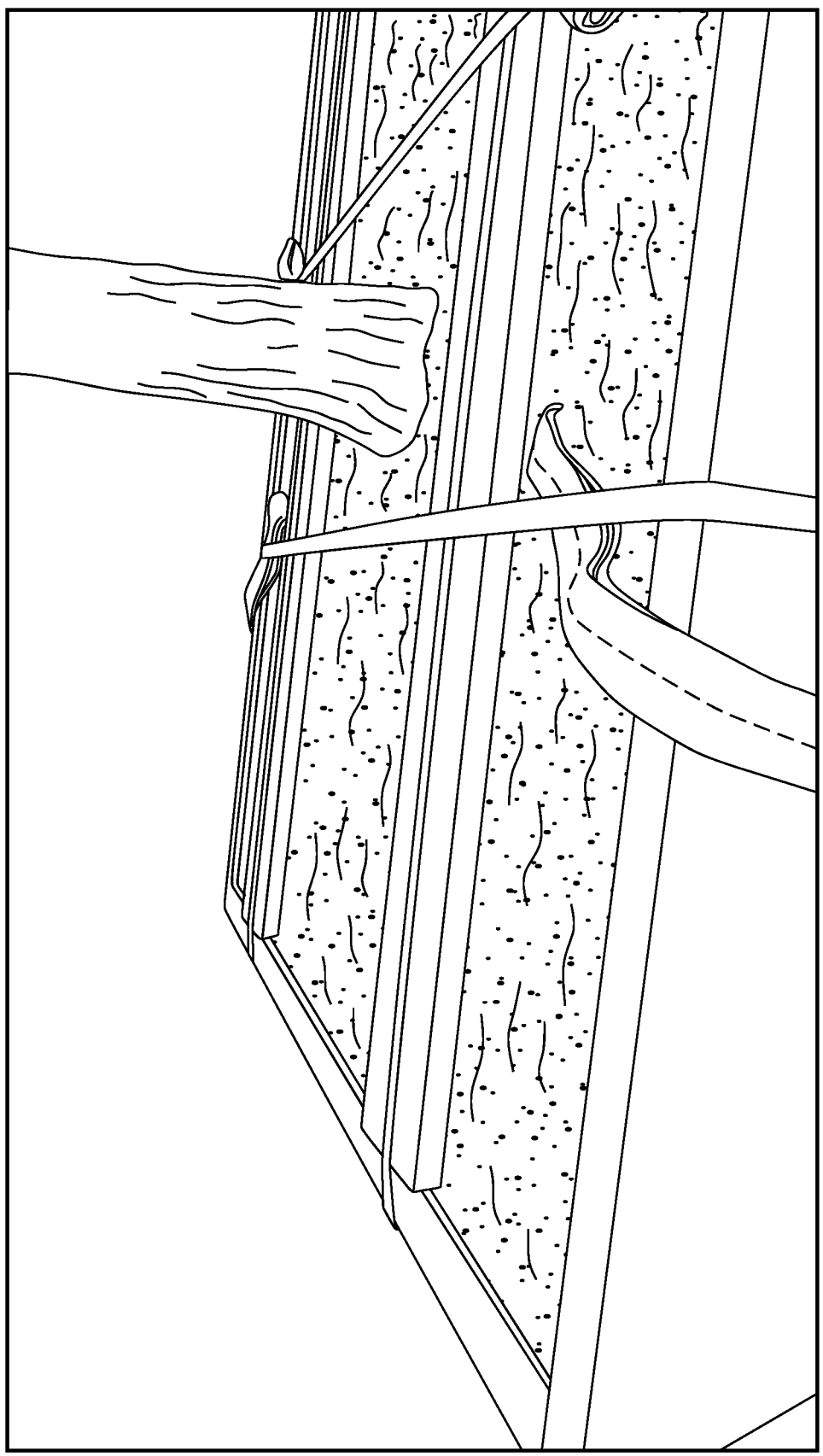
FIG. 27 is a perspective top view of a tree planted and secured with straps and boards into the tree box of FIG. 16
Figure 28:
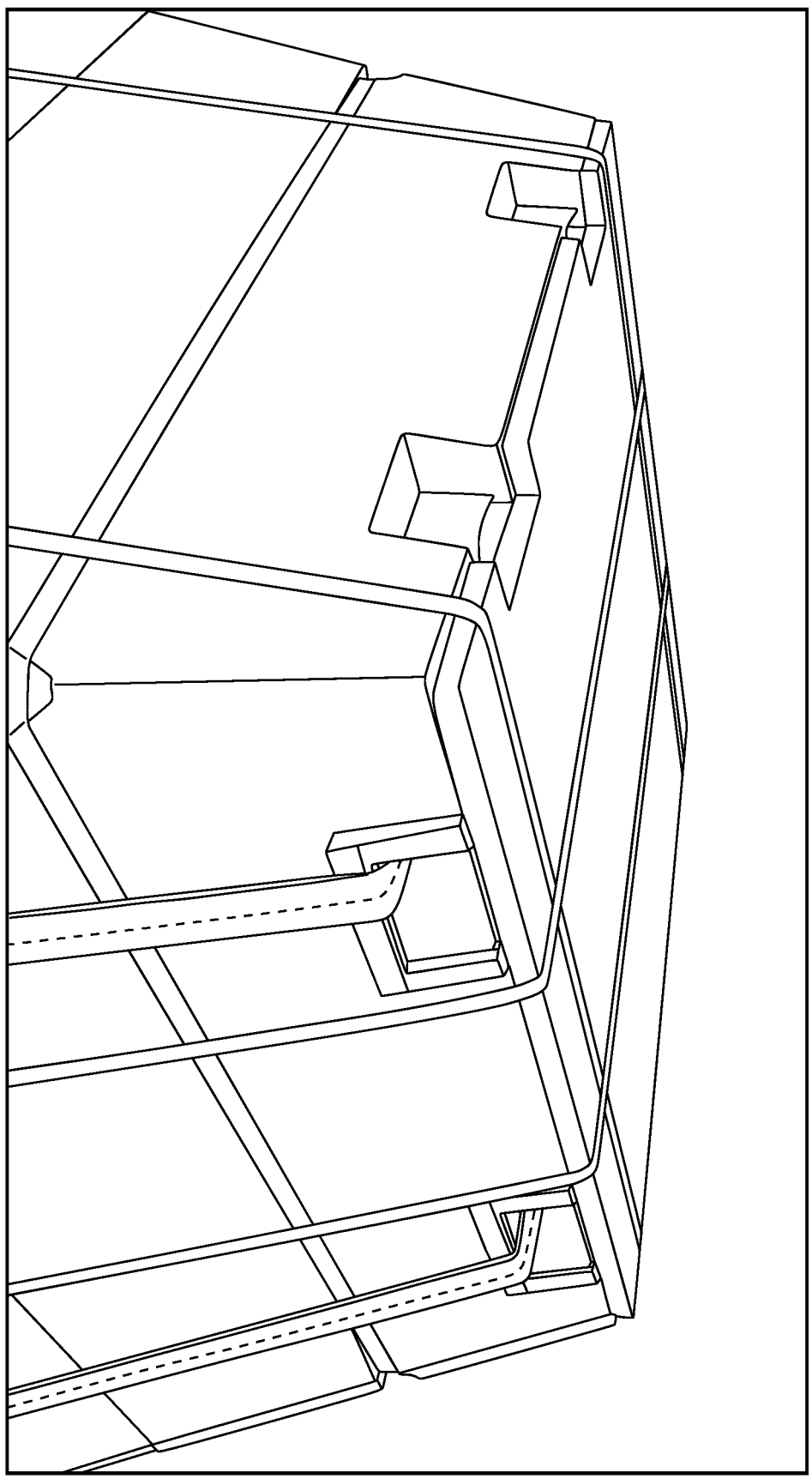
FIG. 28 is a perspective bottom view of the tree box assembly of FIG. 27, lifted with straps running through the forklift compatible lifting tubes.
Figure 29:
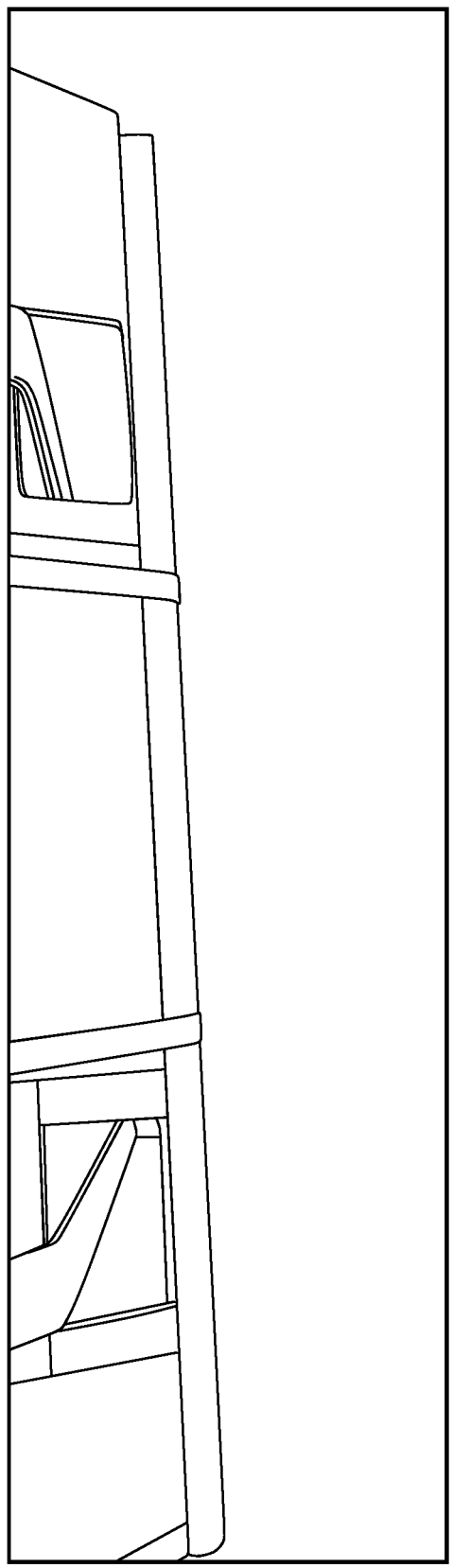
FIG. 29 is a perspective side view of the non-sagging bottom of the tree box assembly of FIG. 27, suspended with straps running through the forklift compatible lifting tubes.

FIGS. 27-29 is the tree box assembly of FIG. 19 after the tree is planted. In this example, one-by-six inch wooden boards are added for extra support and placed under vertical straps used to secure the bottom panel to the box. For example, the vertical straps may be made of 3/4 inch galvanized metal. Yellow straps may also be placed through the lifting tubes and used to lift the assembly using the forklift.

Notches in the side panels that are not engaged with the lifting tubes may be left unplugged to let water drain from the tree box if overwatered.

FIG. 29 depicts a tree box bottom that does not sag, thus leaving the root system undisturbed and undamaged.

Figure 30:
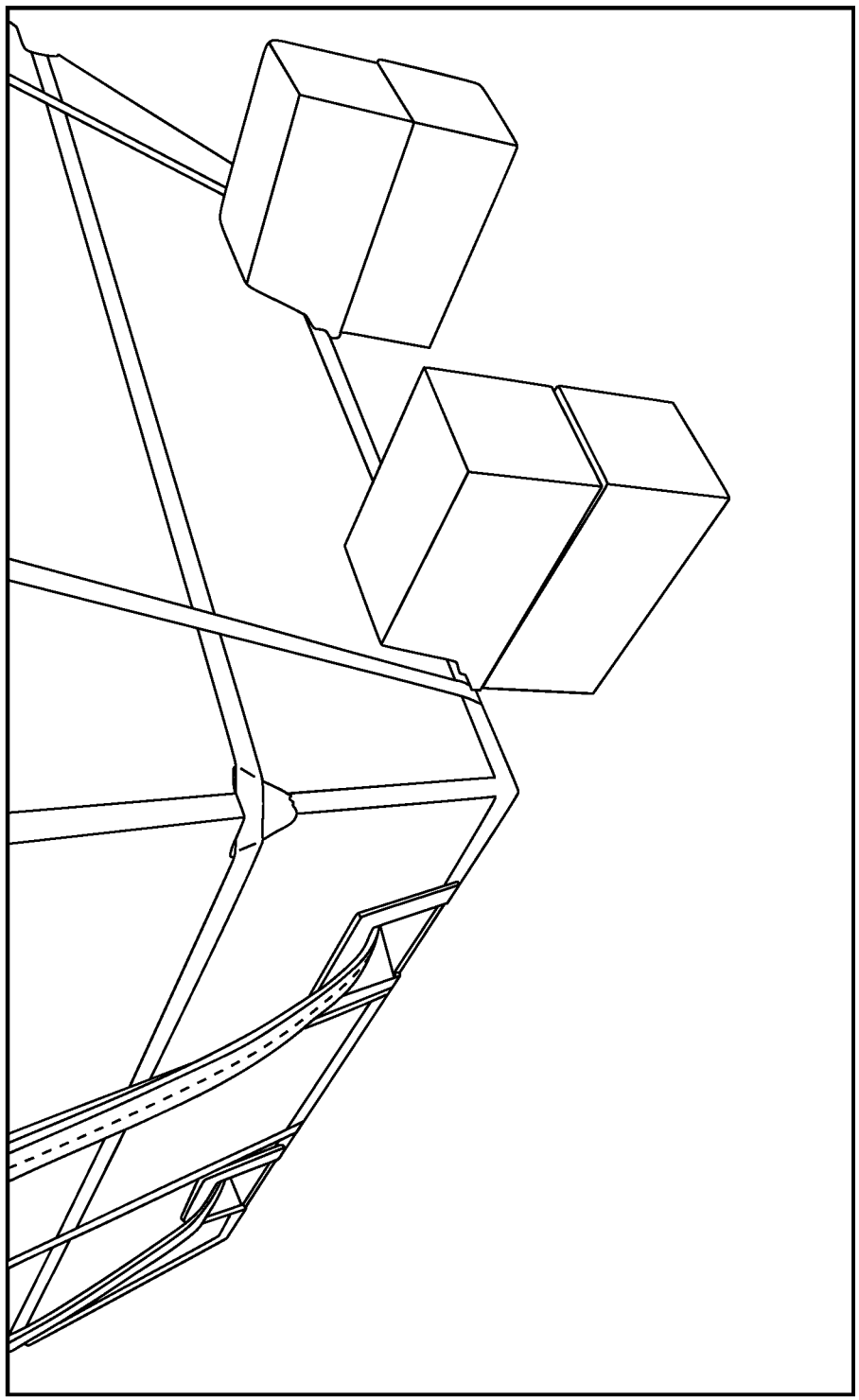
FIG. 30 is a perspective side view of the tree box assembly of FIG. 27 placed on blocks before being disassembled and planted.

FIG. 30 is the tree box of FIGS. 27-29 placed on blocks. The blocks can be used to allow disassembly of the tree box.

Figure 31:
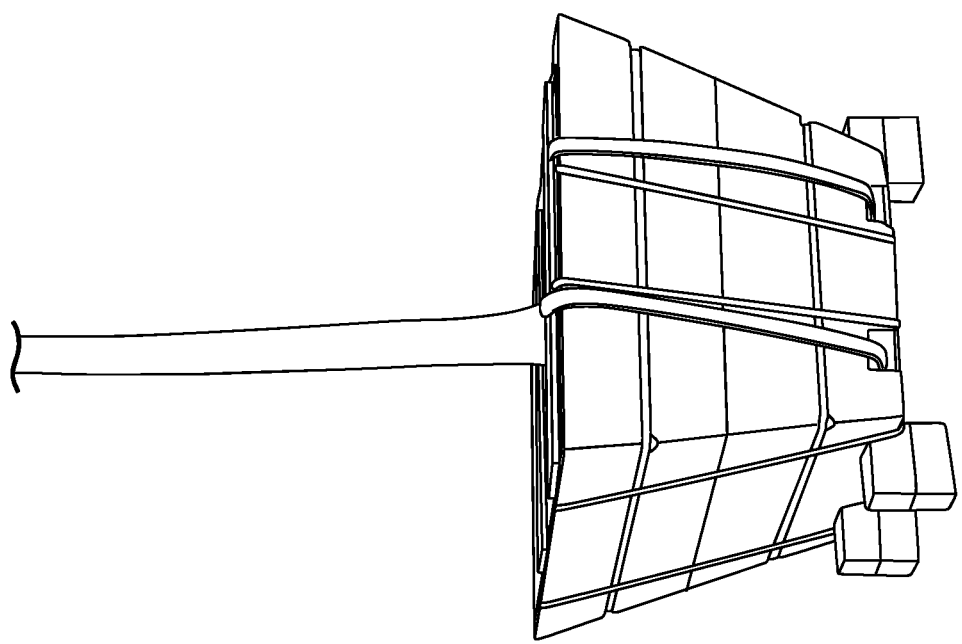
FIG. 31 is a distance perspective side view of the tree box assembly of FIG. 30.

FIG. 31 is a distance view the tree box assembly of FIG. 30

An example process of planting a tree using a bottomless tree box may include: (1) digging an oversize hole at the planting site with a level bottom, (2) setting the tree box assembly on blocks as depicted in FIG. 30, (3) cutting the vertical straps, (4) pushing the lifting tubes and bottom panel down so they are no longer engaged with the tree box assembly, (4) replacing the lifting straps through the voids left by the lifting tubes, (5) lifting the remainder of the tree box by the lifting straps into the planting hole, (6) cutting the horizontal box straps, (7) removing the tree box side panels and lifting straps, (8) backfilling soil around the tree.

Figure 33:
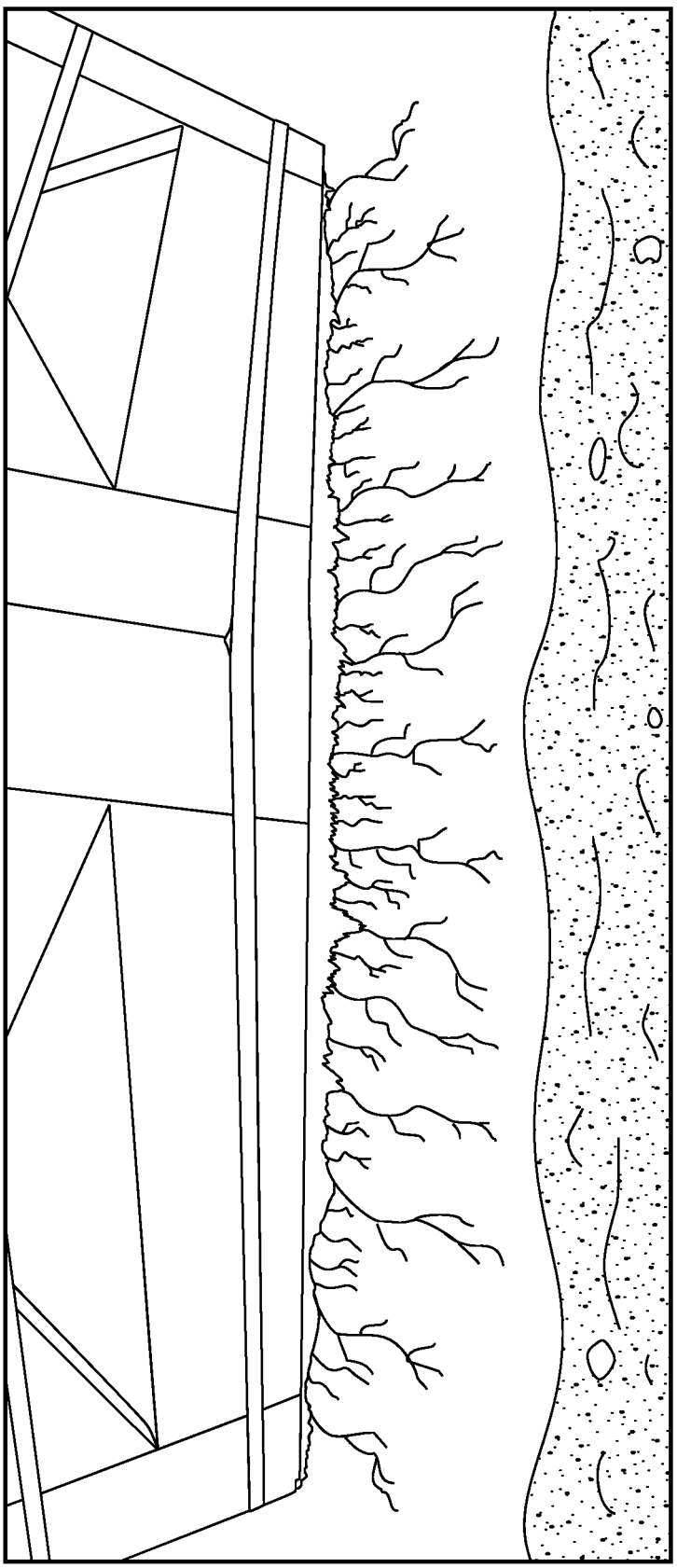
FIG. 33 is a perspective side view of the tree box of FIG. 9 with no bottom.

FIG. 33 is a side view of an example wood bottomless tree box before being placed in the planting hole and being disassembled. Note the fibrous root system capable of making direct earth contact after planting.

Figure 35:
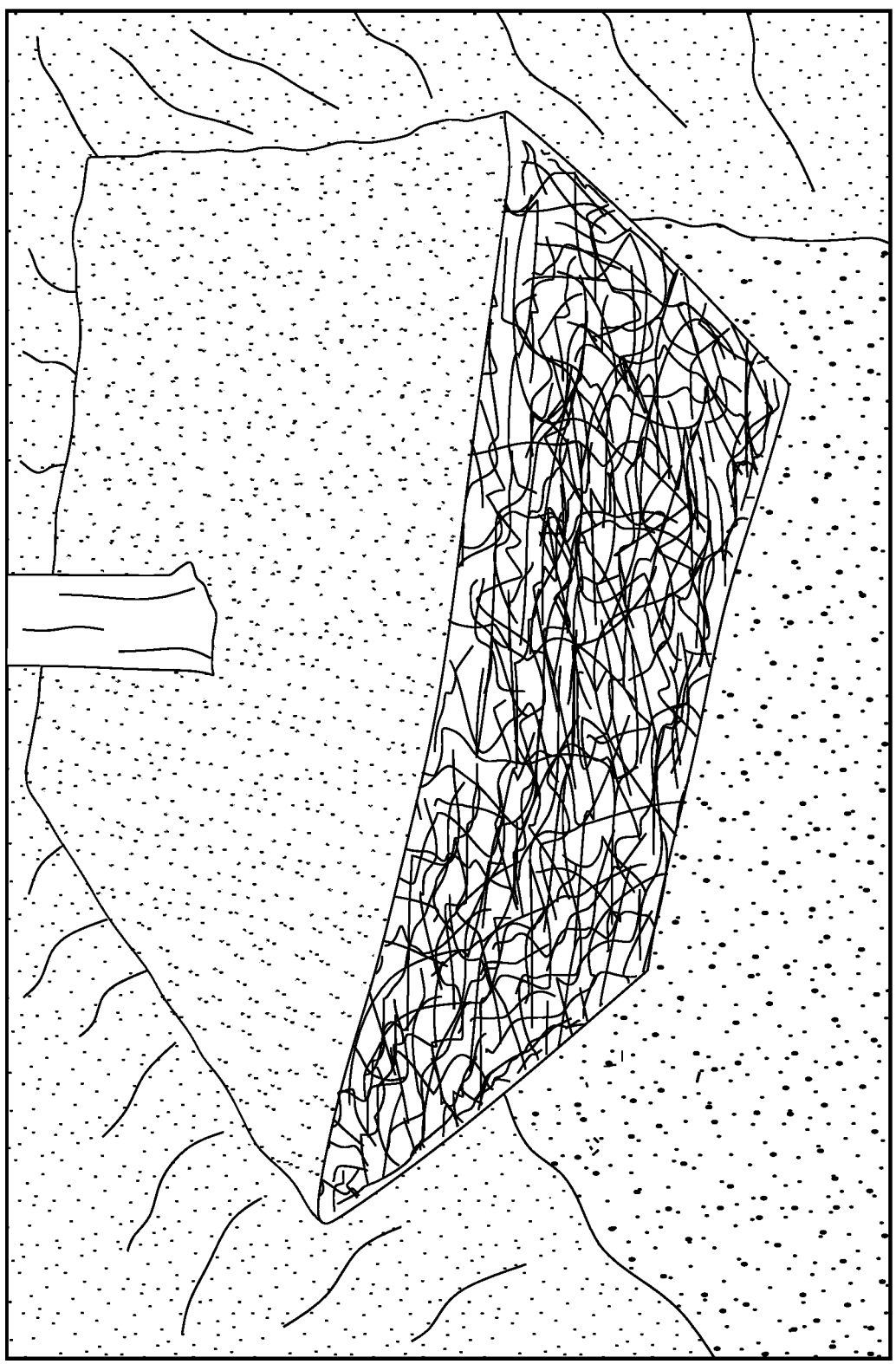
FIG. 35 is a perspective top view of a tree after being removed from a tree box and set in planting hole.

FIG. 35 is a tree box placed within the planting hole after the tree box was disassembled from around it.

All dimensions described in this disclosure are provided by way of example only, and other dimensions that are larger or smaller than those indicated here are used in other embodiments. For example, in some embodiments any one or more of the dimensions are in a range from 50% to 150% of the stated dimension, and in other embodiments any one or more of the dimensions are in a range from 75% to 125%, 80% to 120%, 90% to 110%, 95% to 105%, or 99% to 101% of the stated dimensions. These tree boxes can be produced from 2 feet to 14 feet with custom heights, depending on the specific requirements on the tree and project.

Although the tree box is described herein with reference to an example of a four-sided box, other tree containers having other shapes and sizes are also within the scope of this disclosure. The tree container can have from 3 to 10 sides, for example, and may have multi-sided shapes including (e.g., triangle, pentagon, octagon, etc.). In another possible embodiment, the tree container can have one side, such as being circular, or circular with a single flat surface extending along one side for ease of transportation.

The various embodiments described herein are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A tree box for growing and transporting a tree, the tree box comprising:
   four side panels having a same size and shape that collectively form four sides of the tree box, the four sides, when assembled, defining an interior space therein and having an open top and a bottom, each of the side panels including:
   a top edge;
   a bottom edge, wherein the top edge and bottom edge are parallel;
   a first side edge;
   a second side edge, wherein the first side edge and the second side edge are tapered inward from the top edge to the bottom edge, such that the top edge is longer than the bottom edge;
   wherein at least one of the first and second side edges comprises a rabbet joint groove formed therein, such that the first and second side edges of adjacent side panels form a joint that connects the first and second side edges of adjacent side panels together;
   a flat body that extends between the top edge, the bottom edge, the first side edge, and the second side edge, the body being formed of a single piece of machined high density polyethylene (HDPE), the body having an exterior-facing surface and an interior-facing surface;
   banding notches formed into the flat body from the exterior-facing surface at the first and second side edges of the side panels, the banding notches arranged and configured to receive and support one or more horizontal bands therein;
   air root pruning fabric arranged at the interior-facing surface of the body; and
   at least two lifting tube notches that are formed in the body and extend into the body from the bottom edge; and
   at least two removable and hollow forklift compatible lifting tubes, which when installed, extend across the interior space proximate to the bottom with opposite ends of the at least two lifting tubes being inserted into the lifting tube notches of opposing side panels, the at least two lifting tubes being parallel to each other; and
   a removable bottom panel that, when installed, extends across the bottom and underneath the at least two lifting tubes, the removable bottom panel having an interior-facing surface and an exterior-facing surface, and having air root pruning fabric attached to the interior-facing surface of the removable bottom panel, the removable bottom panel including notches extending into the removable bottom panel from one or more edges thereof, wherein when the removable bottom panel is arranged at the bottom edges of the side panels, the notches of the removable bottom panel each define an opening that provides access to at least one of the bottom edges of the side panels to permit the at least one of the bottom edges to be supported by a support member when the support member is arranged underneath the bottom edge to support the tree box while the removable bottom panel is removed.

2. The tree box of claim 1, wherein the side panels, when assembled, have a taper angle in a range from 13 degrees to 17 degrees.

* * * * *